(12) United States Patent
Hendlin et al.

(10) Patent No.: US 11,568,475 B2
(45) Date of Patent: *Jan. 31, 2023

(54) GENERATING CUSTOM MERCHANT CONTENT INTERFACES

(71) Applicant: Meta Platforms, Inc., Menlo Park, CA (US)

(72) Inventors: Zachary Garth Hendlin, Menlo Park, CA (US); Rohan Kuruvilla, San Francisco, CA (US); Krishnatheja Vudata, San Francisco, CA (US); Zewen Fei, San Mateo, CA (US); Hamza Aftab, San Francisco, CA (US); Adithya Venkata Surampudi, Menlo Park, CA (US); Kai Ding, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 16/703,592

(22) Filed: Dec. 4, 2019

(65) Prior Publication Data

US 2020/0104909 A1 Apr. 2, 2020

Related U.S. Application Data

(63) Continuation of application No. 15/238,929, filed on Aug. 17, 2016, now Pat. No. 10,529,010.

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0643* (2013.01); *G06Q 30/0621* (2013.01); *G06Q 50/01* (2013.01)

(58) Field of Classification Search
CPC . G06Q 30/0643; G06Q 30/0621; G06Q 50/01
(Continued)

(56) References Cited

U.S. PATENT DOCUMENTS

| 8,527,369 B1 | 9/2013 | Yalamanchi et al. |
| 2015/0100459 A1 | 4/2015 | Linden et al. |
| 2018/0053244 A1 | 2/2018 | Hendlin et al. |

OTHER PUBLICATIONS

Tulchinsky, Ilia, et al. "Realworld Products in Virtual Environments". Ip.com https://ip.com/IPCOM/000229273. Jul. 17, 2013. (Year: 2013).*

(Continued)

*Primary Examiner* — Anand Loharikar
(74) *Attorney, Agent, or Firm* — Keller Preece PLLC

(57) ABSTRACT

One or more embodiments of the disclosure include a digital merchant content system that creates one or more custom merchant content interfaces. In particular, in one or more embodiments, the digital merchant content system generates custom merchant content interfaces based on a custom merchant content template. The digital merchant content system can generate custom merchant content templates comprising unpopulated product display layouts. Moreover, in one or more embodiments, the digital merchant content system receives a product feed and generates a custom merchant content interface by populating the unpopulated product display layouts based on the custom merchant content template and the product feed.

20 Claims, 20 Drawing Sheets

(58) Field of Classification Search
USPC .............................................. 705/26.1–27.2
See application file for complete search history.

(56) References Cited

OTHER PUBLICATIONS

U.S. Appl. No. 15/238,929, May 15, 2019, Office Action.
U.S. Appl. No. 15/238,929, Aug. 26, 2019, Notice of Allowance.

* cited by examiner

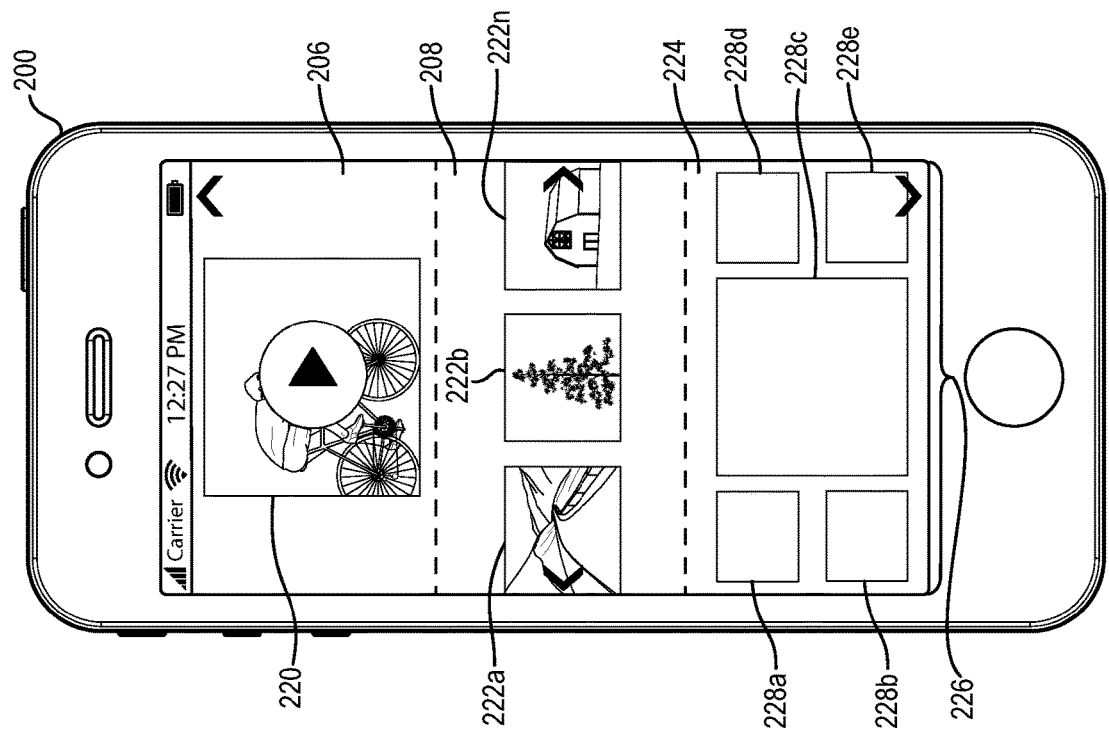
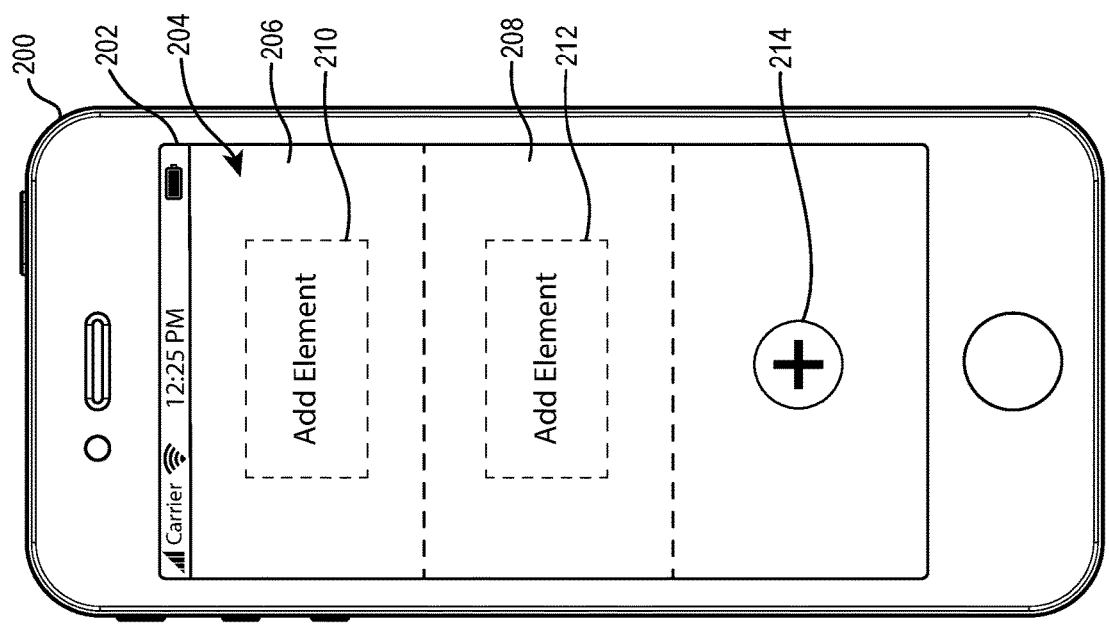
Fig. 2B
Fig. 2A

| Name | Price | Category | Group | On Sale | Sale Price | Color | In Stock |
|---|---|---|---|---|---|---|---|
| Product 1 | $29.99 | Accessories | Hats | No | $24.99 | Red | Yes |
| Product 2 | $19.99 | Clothing | Shirts | Yes | $17.99 | Green | Yes |
| Product 3 | $99.99 | Clothing | Jeans | Yes | $79.99 | Blue | Yes |
| Product 4 | $125.00 | Shoes | Athletic | No | $99.99 | White | No |
| Product 5 | $150.00 | Shoes | Dress | No | $130.00 | Black | No |
| Product 6 | $29.99 | Accessories | Belts | No | $25.00 | Brown | Yes |

*Fig. 3A*

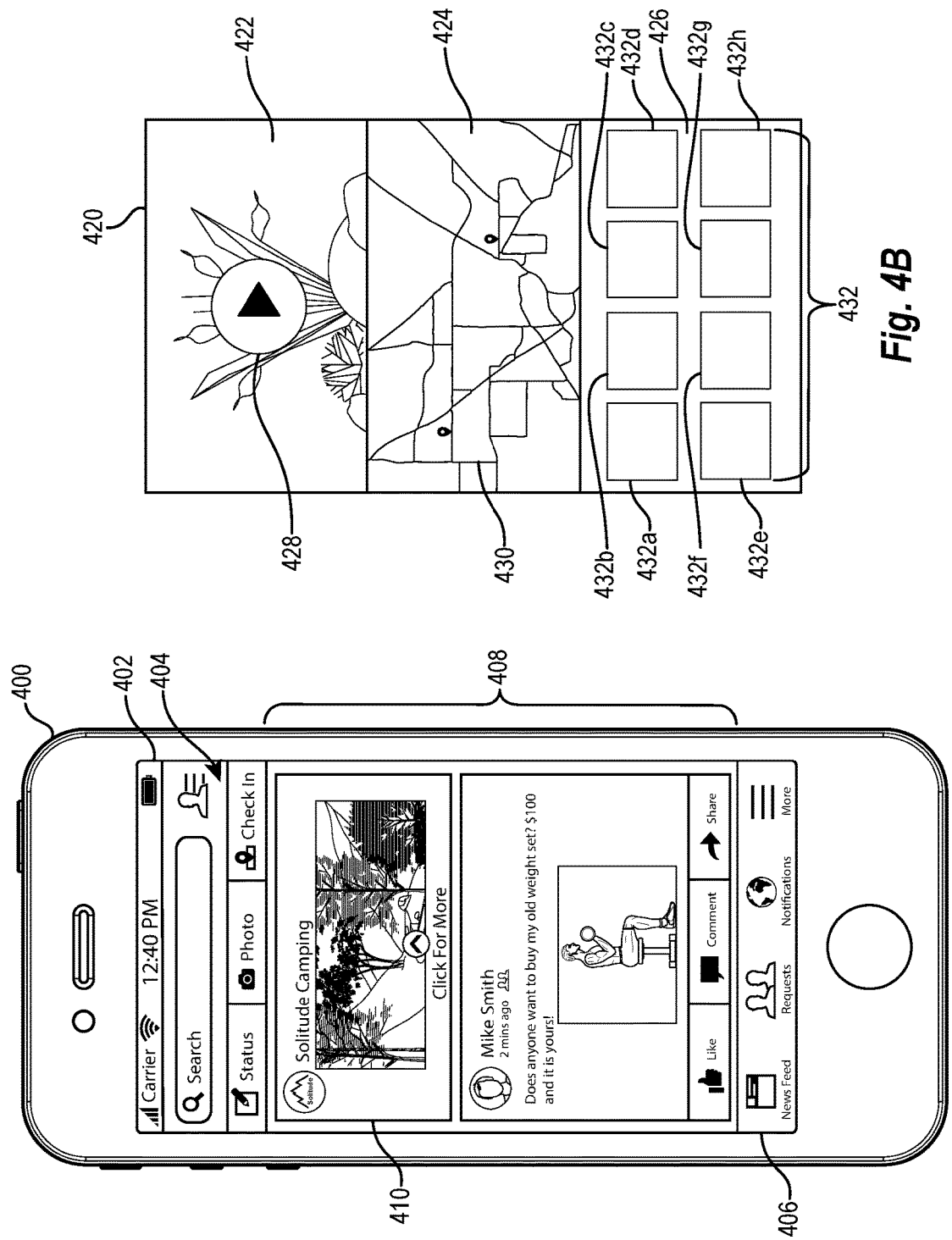

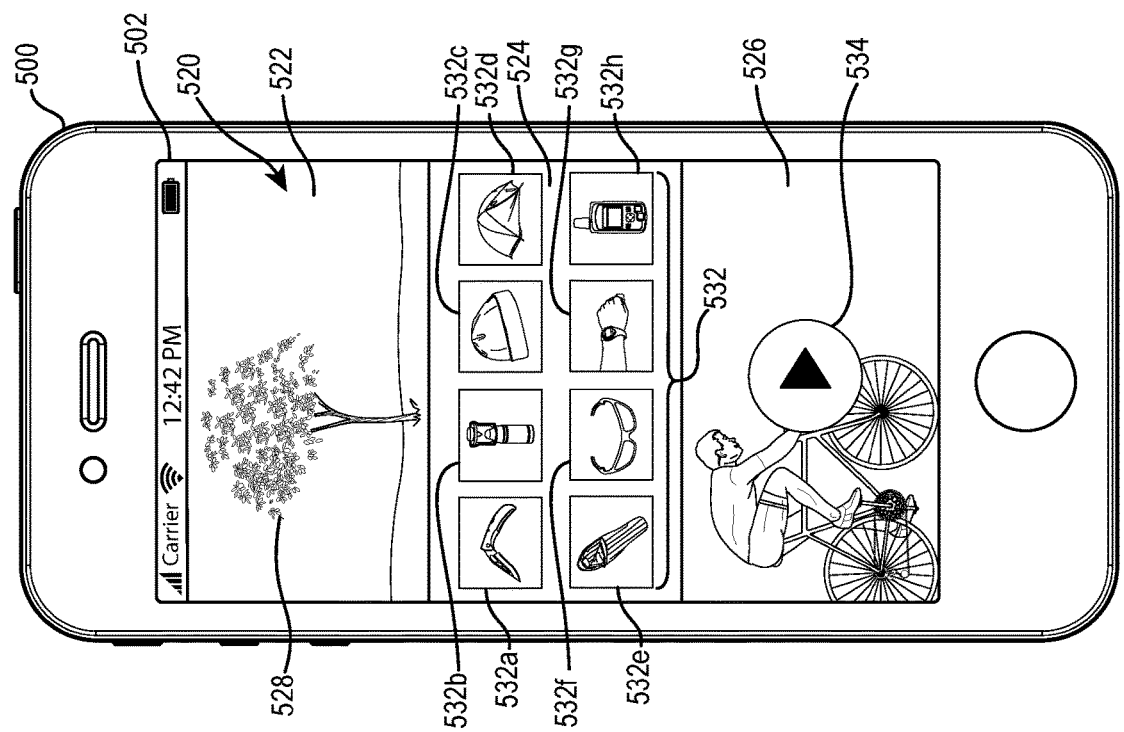

GENERATING CUSTOM MERCHANT CONTENT INTERFACES

CROSS-REFERENCE TO RELATED APPLICATIONS

The present application is a continuation of U.S. application Ser. No. 15/238,929, filed on Aug. 17, 2016. The aforementioned application is hereby incorporated by reference in its entirety.

BACKGROUND

Recent years have seen rapid growth in the number and frequency of merchants utilizing the Internet to provide information to other individuals and businesses. Indeed, it is now common for merchants to provide information regarding products or services via a variety of third-party websites in an attempt to interact with and engage actual and/or potential customers. For example, a business can provide product updates, news, and/or marketing materials via a variety of websites.

Although conventional digital information systems allow individuals and business to share information via the Internet, they also have a number of drawbacks. For example, consumers often express frustration with information posted by merchants on Internet websites. For example, information posted by a merchant on a third-party website is often relatively limited. Accordingly, potential consumers may have little interest in the information provided, and consumers that have interest often have to identify and navigate to a separate merchant system to obtain additional information (e.g., separate from the third-party website).

Similarly, merchants frequently express frustration with the time and expense required to generate, post, and update information in relation to conventional digital information systems. In particular, many conventional digital information systems often require merchants to invest significant time and resources into updating product or service information on the third-party system. For example, anytime a merchant wishes to change a product focus, offer a new product, or remove a sold-out product, the merchant often manually has to upload and reconfigure the merchant's storefront on the third-party system. Moreover, conventional digital information systems require significant computing resources, computing time, and communication bandwidth to transfer information between merchant and third-party servers.

These and other problems exist with regard conventional digital information systems for providing merchant information via third-party systems.

SUMMARY

One or more embodiments described below provide benefits and/or solve one or more of the foregoing or other problems in the art with systems and methods for providing custom merchant content interfaces via an application (e.g., an application that is separate from the merchant, such as a social networking application). In particular, in one or more embodiments, the disclosed systems and methods generate custom merchant content templates in conjunction with a merchant. Furthermore, the systems and methods receive a product feed that corresponds to the merchant's products. The systems and methods then utilize the custom merchant content template together with the product feed (and/or social networking system data) to generate custom merchant content interfaces. In this manner, the disclosed systems and methods can provide customized, native, real-time, immersive, merchant content to users within the application without having to redirect a user to a separate merchant system.

In particular, in one or more embodiments, the systems and methods enable a merchant to generate a custom merchant content template that includes an unpopulated product display layout specified by the merchant. For instance, in some embodiments, the unpopulated product display layout specifies custom formatting, style, product types, branding, and/or other custom features. Based on receiving a product feed that includes product information specified by the merchant, the systems and methods can create a custom merchant content interface by populating the unpopulated product display layout using the product information from the product feed.

In addition, one or more embodiments, the systems and methods can provide a customer merchant content interface for display to a user. For example, in one or more embodiments, the systems and methods provide a selectable element corresponding to a merchant (e.g., an advertisement for the merchant) for display via a native application (e.g., a social networking application) on a client device of a user. Upon receiving an indication of a user interaction with the selectable element, the systems and methods provide for display, via the native application and without redirecting to a separate system or application, a custom merchant content interface. Moreover, in some embodiments, the systems and methods can populate the custom merchant content template based at least in part on one or more characteristics or attributes associated with the user of the client device.

The disclosed systems and methods provide a number of advantages over conventional digital information systems. Indeed, utilizing a product feed and custom merchant content templates, various embodiments of the systems and methods can generate and provide custom merchant content interfaces directly to users without requiring users to navigate to a separate system from the native application (e.g., a merchant website or other application/website). Furthermore, the systems and methods allow a merchant to easily and efficiently can provide custom, targeted, real-time, up-to-date information to users via a native, immersive experience. Indeed, in one or more embodiments, the systems and methods generate custom merchant content interfaces with the look and feel of a custom merchant application running on a mobile device while maintaining the continuity of the user experience within the native application (e.g., the social networking application). Moreover, maintaining custom merchant content templates and generating custom merchant content interfaces via the social networking system reduces computing resources and computing time required to provide content to users.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

FIGS. 2A-2C illustrate a computing device and user interface for generating a custom merchant content template in accordance with one or more embodiments;

FIGS. 3A-3B illustrate representations of product feeds in accordance with one or more embodiments;

FIG. 4A illustrates a social networking application running on a client device and displaying a social network feed comprising a selectable element in accordance with one or more embodiments;

FIG. 4B illustrates a representation of identifying a custom merchant content template in accordance with one or more embodiments;

FIGS. 5A-5C illustrate selecting a custom merchant content template from a plurality of custom merchant content templates and generating a custom merchant content interface in accordance with one or more embodiments;

DETAILED DESCRIPTION

Figure 1A:
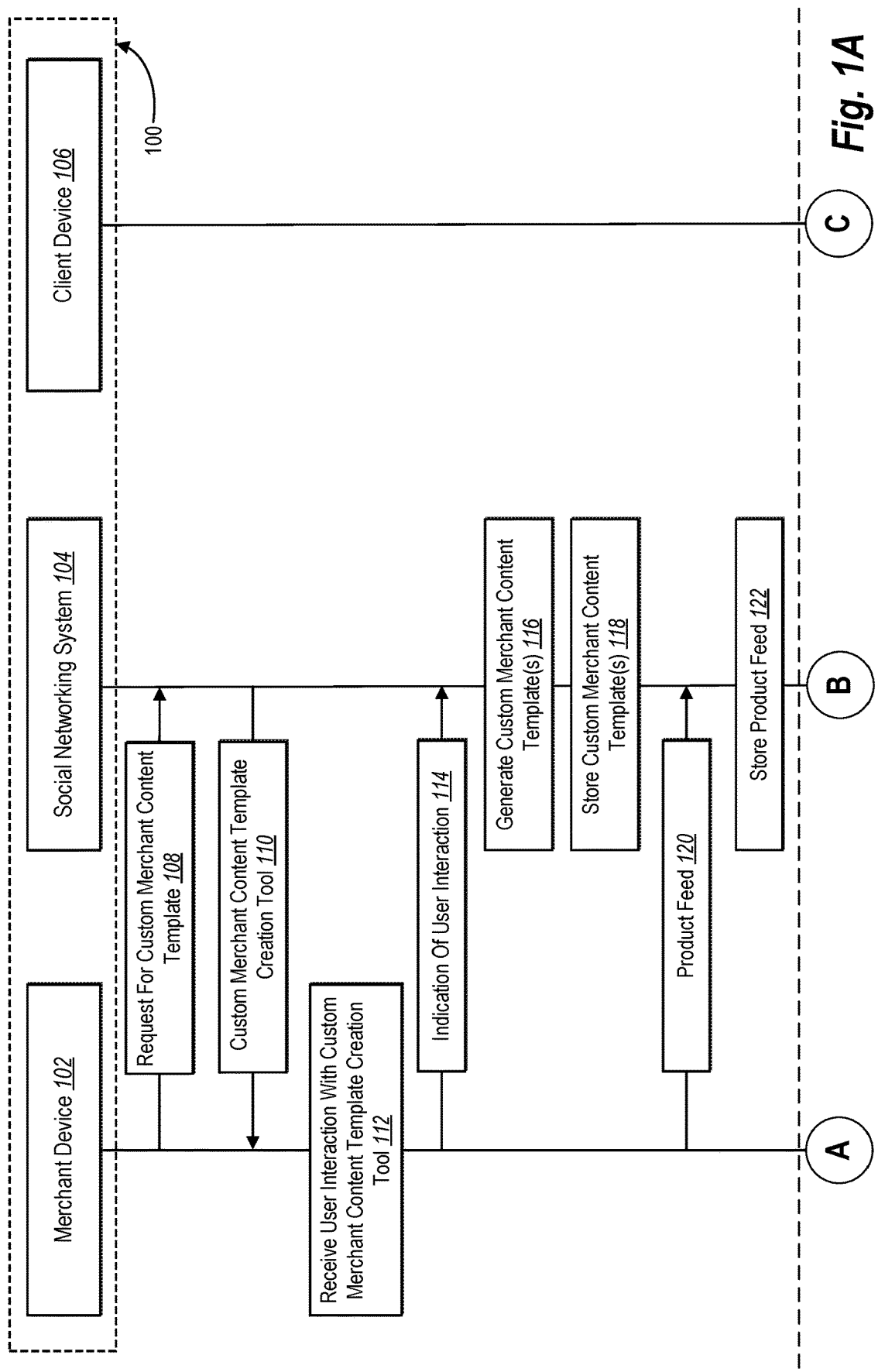
FIGS. 1A-1C illustrate a sequence diagram of a plurality of steps in a method of generating custom merchant content interfaces in accordance with one or more embodiments.

One or more embodiments of the present invention include a digital merchant content system that provides one or more custom merchant content interfaces within a system and/or application that is separate from a merchant (e.g., a social networking system and/or application). In particular, in one or more embodiments, the digital merchant content system generates custom merchant content interfaces that provide targeted, up-to-date, merchant content within a social networking system. More specifically, in one or more embodiments, the digital merchant content system creates custom merchant content templates that include digital media and unpopulated product displays corresponding to a merchant. Moreover, the digital merchant content system can generate and provide custom merchant content interfaces to users of the social networking system based on the custom merchant content templates, product feeds, and social networking system data gathered within the social networking system.

For example, in one or more embodiments the digital merchant content system generates a custom merchant content template (e.g., a custom merchant content template containing merchant provided media content items with an unpopulated product display layout specified by the merchant). Moreover, the digital merchant content system can receive a product feed comprising product information corresponding to the merchant. Further, in one or more embodiments, the digital merchant content system generates a custom merchant content interface by populating the unpopulated product display layout within the custom merchant content template based on the product information from the product feed. Additionally, the digital merchant content system provides a selectable element corresponding to the merchant for display on a client device of a user via a social networking application. Upon receiving an indication of user interaction with the selectable element, the social networking system provides for display on the client device the custom merchant content interface created by the digital merchant content system.

The digital merchant content system provides a variety of advantages over existing systems and methods. Utilizing a product feed and custom merchant content templates, the digital merchant content system can generate and provide custom merchant content interfaces directly to users of the social networking system. Accordingly, in one or more embodiments, users need not navigate away from the social networking system to obtain detailed merchant content. Rather, the digital merchant content system can provide an immersive environment of merchant content by populating the custom merchant content template with product information from a product feed. Indeed, in one or more embodiments, the digital merchant content system provides, within an application running on a mobile device, the look and feel of a customized merchant interface without leaving the native application. The digital merchant content system can therefore result in increased user satisfaction and engagement, as well as increased merchant usability, customization, and controllability of merchant content.

In addition, utilizing custom merchant content interfaces, the digital merchant content system can provide custom, targeted, real-time, up-to-date information to users. Indeed, the digital merchant content system can populate a custom merchant content template based on updated information in a product feed and/or social networking system data. By so doing, users can receive more robust, accurate, targeted, and timely merchant information via the social networking system.

Furthermore, utilizing custom merchant content interfaces, one or more embodiments of the digital merchant content system provides up-to-date, targeted interfaces without requiring additional input, design, or time investment by merchants. For instance, upon establishing a custom merchant content template, in one or more embodiments, the digital merchant content system can automatically populate custom merchant content interfaces (e.g., based on an updating product feed). Therefore, the digital merchant content system can provide customization of merchant content with a minimal investment of time or resources. Indeed, the digital merchant content system can generate opportunities for individuals and small businesses that otherwise lack the time and/or financial resources to provide automatically updating, targeted, information to other users (e.g., customers).

Moreover, by generating custom merchant content interfaces at the social networking system, the digital merchant content system can reduce processing time and computing resources over conventional systems. For example, by hosting custom merchant content templates and/or custom merchant content interfaces via a social networking system, the digital merchant content system can reduce remote communication between the social networking system and third-party computers (e.g., merchant computers), and significantly reduce processing requirements. Moreover, by reducing processing requirements and response time, the digital merchant content system can provide a more responsive experience for accessing merchant content via a social networking system.

As mentioned above, in one or more embodiments, the digital merchant content system can generate a custom merchant content template. Specifically, in one or more embodiments, the digital merchant content system provides, via a merchant client device, a merchant with a user interface including customizable, interactive elements for selecting, adding, and arranging media content items, product display layouts, and other content. The digital merchant content system can receive customized content and generate a custom merchant content template. In this manner, the digital merchant content system enables merchants to specify templates with media content specific to their particular business, brand, and preferences while also leaving unpopulated elements (e.g., unpopulated product display layouts) that can be uniquely tailored in real-time by the social networking system.

Furthermore, upon creating a custom merchant content template, the digital merchant content system can also identify a product feed. For instance, in one or more embodiments, the digital merchant content system obtains a product feed comprising an updating database with product information from a merchant (e.g., an updating database of product names, product styles, product groups, product sales, product prices, and/or other product attributes). Similarly, in one or more embodiments, the digital merchant content system obtains a product feed in the form of a merchant website that includes product information (e.g., a URL to a merchant webpage of products that allows the digital merchant content system to scrape product information).

In addition, as mentioned above, the digital merchant content system can also utilize a product feed. For instance, the digital merchant content system can utilize a product feed to generate a custom merchant content interface. For instance, in one or more embodiments, the digital merchant content system generates a custom merchant content interface based on a custom merchant content template and a product feed. For example, in one or more embodiments, the digital merchant content system generates a custom merchant content interface by populating a product display layout from the custom merchant content template based on product information from a product feed.

In addition to utilizing a product feed, the digital merchant content system can also generate a custom merchant content interface based on other information. For example, in one or more embodiments, the digital merchant content system utilizes social networking system data (e.g., user characteristics, product sales, product clicks, or other data gathered via a social networking system) to generate a custom merchant content interface. Specifically, in one or more embodiments, the digital merchant content system utilizes social networking system data to populate a product display layout from a custom merchant content template in generating a custom merchant content interface. In this manner, the digital merchant content system can generate uniquely tailored, up-to-date, custom merchant content interfaces via a social networking system.

Although the previous examples discuss a single custom merchant content template and a single resulting custom merchant content interface, in one or more embodiments, the digital merchant content system can generate multiple custom merchant content templates and/or multiple custom merchant content interfaces. For instance, in one or more embodiments, the digital merchant content system generates a plurality of custom merchant content templates and selects a subset of custom merchant content templates to utilize in creating a plurality of custom merchant content interfaces.

To illustrate, in one or more embodiments, the digital merchant content system generates a plurality of custom merchant content templates, selects a main custom merchant content template (e.g., a custom merchant content template directed to a merchant generally) and a plurality of auxiliary custom merchant content templates (e.g., custom merchant content templates directed to individual products or groups of products). Moreover, the digital merchant content system can then generate a main custom merchant content interface and auxiliary custom merchant content interfaces (e.g., by populating unique product display layouts in the main custom merchant template and the auxiliary custom merchant content templates).

Indeed, in one or more embodiments, the digital merchant content system generates a plurality of custom merchant content interfaces by dynamically linking the custom merchant content interfaces. For instance, in one or more embodiments, the digital merchant content system generates a URL specific to each custom merchant content interface in a plurality of custom merchant content interfaces. Furthermore, in one or more embodiments, the custom merchant content interface dynamically generates links between the plurality of custom merchant content interfaces based on the URLs. Thus, the digital merchant content system can generate customized, selectable links that allow users to navigate between custom merchant content interfaces.

By dynamically linking a plurality of custom merchant content interfaces, the digital merchant content system can create an immersive experience that gives the look and feel of a custom experience tailored to the merchant, however, the entire experience is provided via a single application (e.g., provided within a social networking system application). Moreover, by dynamically linking a plurality of custom merchant content interfaces based on the product feed, user characteristics, and other social networking system data, the digital merchant content system can create an immersive experience unique to individual users.

As discussed above, in one or more embodiments, the digital merchant content system generates custom merchant content interfaces and provides the custom merchant content interfaces via a single application, such as a native social networking application on a client device. For example, in one or more embodiments, the digital merchant content system provides a selectable link, in a social network feed of a user via a social networking application. In one or more embodiments, upon selection of the selectable element, the digital merchant content system provides custom merchant content interfaces associated with the selectable element for display. In this manner, the digital merchant content system can naturally and efficiently provide users with merchant content with the look and feel of a customized merchant application from within the native social networking application.

As used herein, the term "custom merchant content template" refers to a digital item defining a user interface with unpopulated interface elements. In particular, the term "custom merchant content template" includes a digital item defining a user interface with an unpopulated product display layout having unpopulated elements and media content items selected by a merchant. For example, a "custom merchant content template" can comprise a digital item defining a user interface comprising media content items specified by a merchant and an unpopulated product display layout specified by a merchant.

As used herein, the term "media content item" refers to any electronic content, regardless of form. For example, the term "media content item" includes a digital image, a digital video, digital audio, a panoramic digital image, a panoramic digital video, interactive digital map, or digital text. Similarly, "media content item" includes any type or variety of file, including a text file, a word processing file, PDF, JPG, GIF, WAV, MOV, or other electronic file.

As used herein, the term "product display layout" refers to an arrangement of a plurality of elements (e.g., user interface elements). In particular, the term "product display layout" includes an arrangement of one or more elements capable of including information regarding a product or service. For example, the term "product display layout" includes a plurality of user interface elements in a particular arrangement, wherein each of the user interface elements is configured to include information regarding one or more products or services of a merchant. For instance, a product display layout can be unpopulated or populated. For example, an unpopulated product display layout includes an arrangement of a plurality of digital elements that do not currently contain information regarding products or services of a merchant. Similarly, a populated product display layout includes an arrangement of a plurality of digital elements that include information regarding products or services of a merchant.

As used herein, the term "element" refers to any digital item or object making up a user interface. For example, the term "element" can include an icon, window, terminal, tag, container, field, frame, box, or graphical control. An element can include digital media items. For example, a digital image or digital video can be associated with an element such that the digital image or digital video is included with the element in a user interface. As just mentioned, an element can be unpopulated or populated. For example, an unpopulated element can comprise a frame or field that is not associated with a digital media item, whereas, a populated element can comprise a frame or field associated with a digital media item. Moreover, as used herein, the term "product element" refers to an element that includes product information regarding one or more products.

As used herein, the term "product feed" refers to a digital item defining product information. In particular, the term "product feed" includes an updating digital item that defines product information corresponding to products or services of a merchant over time. A product feed can take a variety of forms, for example, a product feed can comprise a database, spreadsheet, text file, or other electronic file. For instance, a merchant can maintain an updating database of products or services and provide the updating database as a product feed. In addition, the product feed can comprise a URL to a website. For example, a merchant can maintain an updating website that describes products or services and provide the website as a product feed.

As used herein, the term "product information" refers to data regarding one or more products and/or services. For example, the term "product information" includes data regarding product (or service) name, product (or service) type, product (or service) groups, product (or service) cost, product (or service) sales, product (or service) sale status (e.g., on sale or not on sale), product (or service) stock status (e.g., in stock or out of stock) and/or product (or service) attributes (e.g., color or size). Indeed, although this specification frequently refers to products in describing embodiments of the custom merchant content system and corresponding methods, it will be appreciated that the term products can also include services, as utilized herein.

As used herein, the term "custom merchant content interface" refers to a digital item defining an interface that includes information from a third-party (e.g., a merchant). In particular, the term "custom merchant content interface" includes a digital item defining an interface based on a custom merchant content template (e.g., where unpopulated digital elements have been populated). For example, the term "custom merchant content interface" includes a digital item defining an interface comprising a populated product display layout. To illustrate, the term "custom merchant content interface" includes a product display layout selected by a merchant, populated by product information from a product feed. Thus, for instance, a custom merchant content interface can comprise an arrangement of media content items specified by a merchant and a product display layout specified by a merchant and populated by product information from a product feed.

As used herein, the term "social networking system data" refers to electronic data reflecting user input to a social networking system. In particular, the term "social networking system data" can include information detected and maintained by a social networking system regarding user input provided by users of the social networking system (e.g., nodes and edges in a social graph corresponding to a particular user). To illustrate, social networking system data can include purchases, selections, or views of a user of the social networking system. Similarly, social networking system data includes information stored in user accounts corresponding to users of the social networking system. For instance, social networking system data can include a variety of user characteristics.

As used herein, the term "user characteristics" refers to features of a user. In particular, user characteristics includes data describing features of a user of a social networking system. For example, the term "user characteristics" includes demographic information (e.g., age, gender, sex, marital status), contact information, location information, user history (e.g., user clicks, purchases, views or interactions), computing device information (e.g., device type, operating system, software installed, browsers utilized), or other information regarding a user.

Figure 1B:
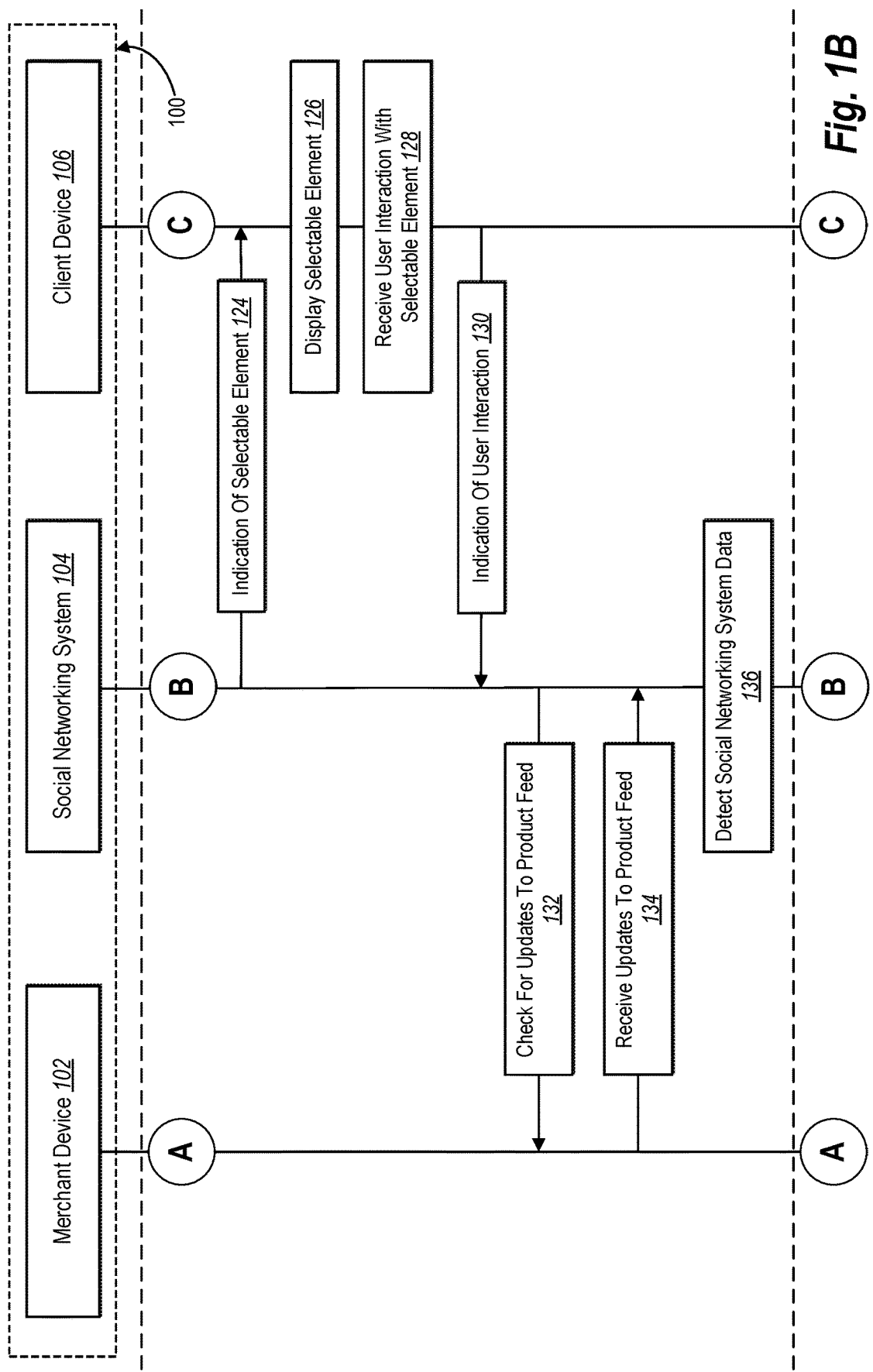
Figure 1C:
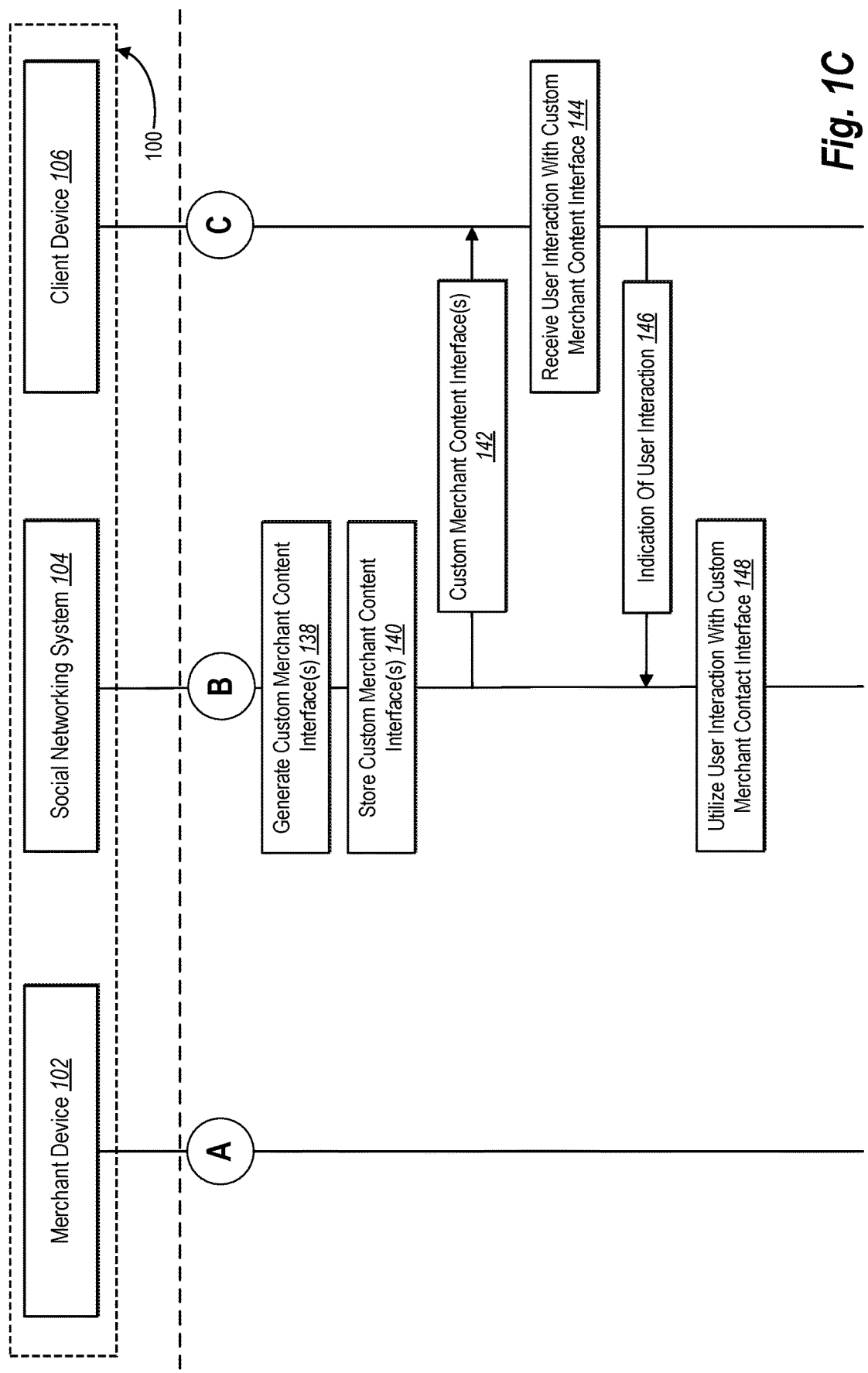

Turning now to FIGS. 1A-1C, additional detail will be provided regarding generating a custom merchant content template and creating a custom merchant content interface in accordance with one or more embodiments. In particular, FIGS. 1A-1C illustrate a representation of a sequence of steps 108-148 performed by a digital merchant content system 100 for generating custom merchant content interfaces. As an initial matter, for purposes of explanation, many embodiments disclosed herein describe the digital merchant content system 100 as including or being part of a social networking system. It should be understood, however, that the same or similar principles, functions, features, and methods described with respect to a social networking system can also be practiced within various other types of computer systems, and as such, various embodiments of the digital merchant content system 100 are not necessarily used in combination with a social networking system.

Nevertheless, FIGS. 1A-1C show the digital merchant content system 100 can reside in part on a merchant device 102, a social networking system 104, and a client device 106. In particular, as discussed in more detail below, the digital merchant content system 100 can comprise computer-executable instructions that, when executed by the merchant device 102, the social networking system 104, and/or the client device 106, cause the merchant device 102, the social networking system 104, and/or the client device 106 to perform the steps 108-148 shown in the sequence diagram of FIGS. 1A-1C. The merchant device 102 and/or client device 106 can comprise a computing device, such as a desktop, laptop, tablet, or mobile device (e.g., a computing device described below in relation to FIG. 10). Moreover, the social networking system 104 can comprise a system that stores one or more social graphs with edges and nodes corresponding to users of the social networking system (as described in greater detail in relation to FIG. 12)

As illustrated in FIG. 1A, the digital merchant content system 100 performs the step 108 of sending a request for a custom merchant content template. In particular, the step 108 can comprise sending a call from the merchant device 102 to the social networking system 104 requesting a tool for generating a custom merchant content template. For example, in one or more embodiments, a merchant can utilize the merchant device 102 to provide verification credentials to the social networking system 104 to log in to an account of the merchant hosted on the social networking system 104 and access one or more tools for generating a custom merchant content template.

As shown in FIG. 1A, upon receiving the request for a custom merchant content template, the social networking system 104 performs the step 110 of providing a custom merchant content creation tool to the merchant device 102. For instance, the step 110 can include providing software or other instructions to the merchant device 102 for generating a custom merchant template. Similarly, the step 110 can include providing access to software or other instructions hosted on the social networking system 104 for generating a custom merchant template.

In relation to the step 110, the social networking system 104 can provide a tool with a variety of interactive elements to enable the merchant to customize a merchant content template. For example, the step 110 can include providing a tool that enables a merchant to add, remove, or arrange interactive elements; add or associate media content items with interactive elements (e.g., images, video, or brand marks); add, remove, modify or arrange unpopulated elements (e.g., an unpopulated product display layout); select or provide merchant preferences; and/or identify a product feed.

As illustrated in FIG. 1A, the merchant device 102 can also perform the step 112 of receiving user interaction with the custom merchant content template creation tool. Furthermore, the merchant device 102 can perform the step 114 of providing an indication of the user interaction to the social networking system 104. Moreover, based on the indication of user interaction, the social networking system 104 can perform the step 116 of generating custom merchant content template(s).

For instance, in relation to steps 112-116 a merchant can interact with various elements of a custom merchant content template creation tool to customize various features in generating a unique custom merchant content template. For example, as mentioned above, the merchant can select and/or arrange interactive elements via the merchant device 102; select media content items to include in elements of the custom merchant content template; and select and/or arrange unpopulated elements.

The merchant can also interact with the custom merchant content template creation tool to generate unpopulated elements that the digital merchant content system 100 can populate at a later time. For example, the merchant can select and/or arrange an unpopulated product display layout. Specifically, the merchant can specify an unpopulated product display layout that comprises a plurality of unpopulated elements that the digital merchant content system 100 can populate (e.g., with media content items regarding one or more of the merchant's products).

In addition to specifying an unpopulated product display layout, the merchant (e.g., via the merchant device 102) can also provide one or more merchant preferences. For example, the merchant can specify preferences to control, at least in part, the digital merchant content system 100 in selecting custom merchant content templates to utilize in generating custom merchant content interfaces (e.g., a first template is specified for use with consumers from age 20-30, while a second template is specified for use with consumers from the age of 40 and up). To illustrate, the merchant can generate a plurality of custom merchant content templates and specify a merchant preference for one or more main custom merchant content templates and one or more auxiliary custom merchant content templates.

Similarly, the merchant can specific preferences to guide the digital merchant content system 100 in populating unpopulated elements of custom merchant content templates (e.g., unpopulated elements can be associated with a product type).

As shown in FIG. 1A, the social networking system 104 can also perform the step 118 of storing the custom merchant content template. In particular, the step 108 can comprise storing a custom merchant content template on one or more servers of the social networking system 104, such that the social networking system 104 can access the custom merchant content template to generate custom merchant content interfaces. For example, the step 108 can comprise associating the custom merchant content template with an account associated with the merchant.

Furthermore FIG. 1A illustrates that the social networking system 104 also performs the step 120 of obtaining a product feed. In particular, as shown, the step 120 can include obtaining a product feed from the merchant device 102. For example, the merchant, via the merchant device 102, can provide the social networking system 104 with an indication of a digital location of an updating database that outlines product information corresponding to the merchant's products. The social networking system 104 can access the product feed by obtaining the updating database from the location identified by the merchant.

As mentioned previously, the step 120 can also include obtaining a product feed from a website that includes a merchant's products or services. In particular, the social networking system 104 can obtain a product feed from a website by parsing the website and identifying product information. For example, in one or more embodiments, the social networking system 104 parses a website and identifies product names, product images and/or video, product prices, product sale status (e.g., products on sale), or product stock status.

In addition, in one or more embodiments, the social networking system 104 parses a website and identifies a product order in relation to products included on the website. Similarly, in one or more embodiments, the social networking system 104 parses a website and identifies product groups from products provided on the website. In this manner, the digital merchant content system 100 can obtain product information without requiring a merchant to provide any information (other than what the merchant already provides in relation to a website already maintained by the merchant).

Moreover, as shown in FIG. 1A, the social networking system 104 can also perform the step 122 of storing the product feed (e.g., storing product information received from the product feed). In particular, the step 122 can include storing product information corresponding to a product feed at the social networking system 104 so that the social networking system 104 can access product information. For example, in one or more embodiments, the step 122 comprises storing a product feed and associating a product feed with a corresponding merchant (e.g., associating the product feed with an account of the merchant).

As illustrated in FIG. 1B, the social networking system 104 also performs the step 124 of sending an indication of a selectable element to the client device 106. In particular, step 124 can comprise sending an indication of a selectable element to a social networking application on the client device 106. For instance, the step 124 can include sending an advertisement for a merchant product to a social networking application running on the client device 106 such that the client device 106 includes the advertisement in a social networking feed provided by the social networking application.

For instance, as shown in FIG. 1B, upon receiving the indication of the selectable element, the client device 106 performs step 126 of displaying the selectable element. In particular, in one or more embodiments, the step 126 includes displaying the selectable element via a social networking application on the client device 106. For example, where the selectable element comprises an advertisement of the merchant, the client device 106 can display the advertisement of the merchant within a social networking feed of the social networking application (e.g., a feed of a plurality of posts from other users of the social networking system).

After displaying the selectable element, as shown in FIG. 1B, the client device 106 can also perform step 128 of receiving a user interaction with the selectable element. Furthermore, the client device 106 can perform step 130 of sending an indication of user interaction to the social networking system 104. For instance, in relation to steps 128-130, the client device 106 can receive a user selection of the selectable element, generate an indication of the user interaction, and send the indication of the user interaction to the social networking system 104.

As further illustrated in FIG. 1B, upon receiving the indication of user interaction with the selectable element, the social networking system 104 performs step 132 of checking for updates to the product feed. In response to checking for updates, the merchant device can provide updates to the product feed, as illustrated in step 134. In particular, the steps 132-134 can include requesting and receiving an updated product feed from the merchant device 102. For example, the social networking system 104 can send a call to the merchant device 102 for an update to a database containing product information and receive an updated database. Similarly, the social networking system 104 can check a website for updated product information relating to a merchant's products (e.g., by parsing a merchant's website for any modifications and updating product information based on the modifications).

As also shown in FIG. 1B, the social networking system 104 can also perform step 136 of detecting social networking system data. In particular, the social networking system 104 can perform the step 136 by monitoring user input and gathering social networking system data. For example, the social networking system 104 can detect user characteristics corresponding to users of the social networking system 104 (e.g., demographic information, location information). Similarly, the social networking system 104 can detect and monitor clicks with selectable elements (e.g., advertisements) on the social networking system 104; product purchases via the social networking system 104; items viewed on the social networking system 104, or communications provided via the social networking system 104 (e.g., social networking posts, social networking comments, or social networking messages).

As shown in FIG. 1C, the social networking system 104 can also perform the step 138 of generating custom merchant content interfaces. In particular, the social networking system 104 can generate a custom merchant content interface based on a custom merchant content template, a product feed, and/or social networking system data. For example, in one or more embodiments, step 138 comprises identifying one or more custom merchant content templates. In particular, the social networking system 104 can identify custom merchant content templates associated with a merchant corresponding to the selectable element (e.g., the custom merchant content template stored at step 118).

Upon identifying one or more custom merchant content templates, the social networking system 104 can generate one or more custom merchant content interfaces utilizing the one or more custom merchant content templates. For example, the social networking system 104 can generate a custom merchant content interface based on a custom merchant content template and a product feed. To illustrate, the social networking system 104 can identify unpopulated elements, such as an unpopulated product display, in a custom merchant content template. The social networking system 104 can then populate the unpopulated elements with product information from the product feed.

For instance, in one or more embodiments, the social networking system 104 can populate an unpopulated product display layout based on product information (e.g., a product name, a product image, a product price, a product order, a product group, product sales, or product attributes) identified in a product feed. In particular, the social networking system 104 can select products to utilize in populating an unpopulated product display layout based on product information. To illustrate, the social networking system 104 can determine from a product feed that a product has a higher volume of sales than other products. Based on the determined volume of sales, the digital merchant content system 100 can select the product for utilization in an unpopulated product display layout. Moreover, the social networking system 104 can populate the unpopulated product display layout with a media content item corresponding to the product.

In addition to sales volume, it will be appreciated that the social networking system 104 can utilize any type of product information to select a product in populating a custom merchant content template. For instance, the social networking system 104 can also utilize a product order or product groups. For example, the social networking system 104 can determine that a merchant website organizes products in a particular product order. The social networking system 104 can populate a product display layout based on the particular product order (e.g., display media content items portraying the products in the same order with regard to an unpopulated product display layout). Similarly, the social networking system 104 can determine that a product feed includes a product group. The social networking system 104 can populate the product display layout based on the determined product group (e.g., select products from the product group to populate the product display layout).

In addition to product information, the social networking system 104 can also generate a custom merchant content interface based on social networking system data. For example, the social networking system 104 can populate unpopulated elements in a custom merchant content template based on social networking system data. In particular, the social networking system 104 can select products to utilize in populating an unpopulated product display layout based on social networking system data.

To illustrate, the social networking system 104 can detect a heightened number of purchases of a particular product (e.g., green hats) on the social networking system 104 with regard to a particular user characteristic (e.g., males between 25 and 30). The social networking system 104 can determine that a user of the client device 106 possesses the particular user characteristic (e.g., the user is a male between 35 and 30). In response, the social networking system 104 can select the particular product (e.g., green hats), and populate an unpopulated product display layout with a media content item corresponding to the particular product (e.g., images of the green hats).

The social networking system 104 can also utilize merchant preferences to generate a custom merchant content interface. For example, as discussed above in relation to steps 112, 114, a merchant can provide merchant preferences in relation to populating unpopulated elements of a custom merchant content template. The social networking system 104 can access such merchant preferences (i.e., merchant preferences stored with the custom merchant content template), and utilize the merchant content preferences to populate a custom merchant content template. To illustrate, a merchant can provide a merchant preference to populate a product display layout with merchant products that are on sale. The social networking system 104 can access a product feed indicating what products are currently on sale, and, based on the merchant preference, populate a product display layout with the identified on sale products.

Although the previous examples focus on generating custom merchant content interfaces based on a product feed, social networking system data, and/or merchant preferences in isolation, it will be appreciated that the digital merchant content system 100 can utilize a product feed, social networking system data and/or merchant preferences in combination to generate a custom merchant content interface. Indeed, in one or more embodiments, the digital merchant content system 100 applies a ranking algorithm that applies criteria based on product information, social networking system data, and/or merchant preferences to rank one or more products in populating a product display layout. Indeed, in one or more embodiments, the digital merchant content system 100 populates a product display layout with media content items corresponding to the highest ranked products from the ranking algorithm.

In addition, it will be appreciated that the step 138 can also comprise generating a plurality of custom merchant content interfaces. Indeed, the step 138 can comprise generating a plurality of custom merchant content interfaces based on a plurality of custom merchant content templates, product information, and/or social networking system data. More specifically, the step 138 can comprise selecting a plurality of custom merchant content templates, populating the selected plurality of custom merchant content templates to generate custom merchant content interfaces, and generating dynamic links between the custom merchant content interfaces.

For instance, as mentioned above, the digital merchant content system 100 (via the merchant device 102 and the social networking system 104) can generate a plurality of custom merchant content templates. The social networking system 104 can select a subset of custom merchant content templates from the plurality of custom merchant content templates. For example, the social networking system 104 can utilize product information from a product feed and/or social networking system data to select a subset of custom merchant content templates from a plurality of custom merchant content templates. Upon selecting the subset of custom merchant content templates, the social networking system 104 can generate a plurality of custom merchant content interfaces based on the subset of custom merchant content templates.

Furthermore, the social networking system 104 can generate dynamic links between each of the plurality of custom merchant content interfaces. In particular, the social networking system 104 can determine URLs corresponding to each custom merchant content interface and then insert links to each URL within custom merchant content interfaces to allow users to navigate between the custom merchant content interfaces. More specifically, the social networking system 104 can populate product display layouts with links to custom merchant content interfaces corresponding to products identified in the product display layouts.

Indeed, upon populating product display layouts with products and corresponding media content items, the social networking system 104 can identify a correspondence between the products in the product display layouts and custom merchant content interfaces. The social networking system 104 can insert links in relation to the populated elements of product display layouts that allow users to navigate to custom merchant content interfaces corresponding to the populated elements. By generating dynamic links in this manner, the digital merchant content system 100 can create and provide a customized native environment within the social networking application on the client device 106.

As shown in FIG. 1C, upon generating the custom merchant content interfaces(s), the social networking system 104 can also perform step 140 of storing the custom merchant content interface. For example, step 140 can include storing the custom merchant content interfaces and dynamic links between the custom merchant content interfaces. Moreover, the social networking system 104 can also perform step 142 of sending custom merchant content interface(s) to the client device 106, as shown in FIG. 1C. In particular, the social networking system 104 can send data to the client device 106 that includes custom merchant content interface(s) and corresponding components (e.g., populated product display layouts, media content items, etc.). For instance, the social networking system 104 can send a custom merchant content interface to the client device 106 for display on the client device 106 via a social networking application.

Upon receiving the custom merchant content interface(s), the client device 106 can perform steps 144 and 146 of receiving user interaction with a custom merchant content interface and sending to the social networking system 104 an indication of user interaction. Moreover, the social networking system 104 performs step 148 of utilizing the user interaction with the custom merchant content interface.

For example, in relation to steps 144-148, the client device 106 can provide a first custom merchant content interface for display and receive a user selection of an element in a product display layout. In particular, the client device 106 can receive a user selection of an element that includes a link corresponding to a second custom merchant content interface. The client device 106 can send an indication of the link corresponding to the second custom merchant content interface to the social networking system 104. In response, the social networking system 104 can then provide the second custom merchant content interface to the client device 106 via the social networking application on the client device 106.

It will be appreciated that the user interaction with the custom merchant content interface (step 144) and utilization of the user interaction action (step 146) can take a variety of forms. Indeed, custom merchant content interfaces can include a variety of user interface elements (e.g., purchase options, call to action buttons, etc.) for performing a variety of actions. For example, rather than selecting a link to another custom merchant content interface, a user of the client device 106 can interact with a selectable element to purchase a product. In response, the social networking system 104 can provide a user interface to complete a purchase transaction via the social networking application on the client device 106.

It will be appreciated that the method described in relation to FIGS. 1A-1C is intended to be illustrative of one or more methods in accordance with the present disclosure, and is not intended to limit potential embodiments. Alternative embodiments can include additional, fewer, or different steps than those articulated in FIGS. 1A-1C. Additionally, the steps/acts described herein may be performed in a different order, may be repeated or performed in parallel with one another, or may be performed in parallel with different instances of the same or similar steps/acts.

For example, although FIGS. 1A-1C illustrate the various steps in a particular sequence, each of the steps can be performed in a different order within the method. For instance, the digital merchant content system 100 can perform steps 132 and 134 of checking for updates to a product feed and receiving updates to a product feed at any time. For example, in one or more embodiments, the digital merchant content system 100 checks for updates in a product feed based on a particular schedule or passage of time (e.g., every thirty minutes, twice a day, or upon every user interaction with a selectable element corresponding to the merchant).

Figure 2C:
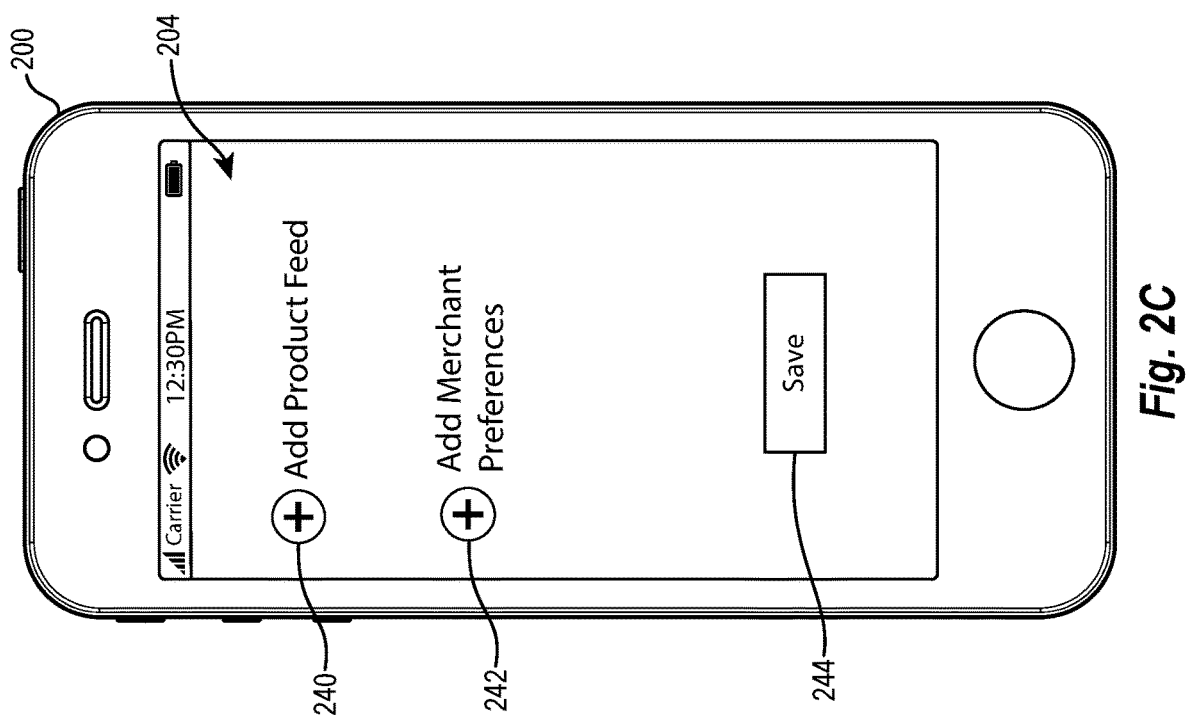

As discussed above, in one or more embodiments, the digital merchant content system 100 generates custom merchant content templates. In particular, in one or more embodiments, the digital merchant content system 100 provides a user interface with interactive elements to allow merchants to assist in generating custom merchant content templates. For example, FIGS. 2A-2C illustrate generating a custom merchant content template based on user input from a merchant in accordance with one or more embodiments.

In particular, FIG. 2A illustrates a computing device 200 with a touchscreen 202 displaying a user interface 204. Moreover, as shown, the user interface 204 includes content areas 206, 208 with selectable elements 210, 212, respectively. Upon user interaction with the selectable elements 210, 212 (i.e., a user interaction from a merchant touching the touchscreen 202) the digital merchant content system 100 adds one or more interactive elements to a custom merchant content template.

For example, upon user interacting with the selectable element 210, the digital merchant content system 100 can provide a plurality of options for adding interactive elements to the custom merchant content template. For instance, the digital merchant content system 100 can provide selectable options that allow a merchant to add elements that include digital video, digital images, panoramic digital images (e.g., tilt-to-view digital images), or panoramic digital video (e.g., tilt-to-view digital video). Upon detecting a user interaction with one or more of the selectable options, the digital merchant content system 100 can add interactive elements to the user interface 204.

The digital merchant content system 100 can also provide options for selecting media content items. In particular, the digital merchant content system 100 can provide options for selecting media content items and associating the media content items with interactive elements. For example, the digital merchant content system 100 can select a media content item stored on the computing device 200 and associate the media content item with an interactive element selected by the merchant.

The digital merchant content system 100 can also provide options for adding unpopulated elements to a custom merchant content template (e.g., elements that the digital merchant content system 100 will populate at a later time). For example, the digital merchant content system 100 can provide an option for adding an unpopulated product display layout. In particular, upon detecting a user interaction with an option for adding an unpopulated product display layout, the digital merchant content system 100 can generate one or more unpopulated interactive elements on the user interface 204.

The digital merchant content system 100 can allow for additional customization of a custom merchant content template. For example, as illustrated in FIG. 2A, the user interface 204 can also include a content area addition element 214. Based on detecting a user interaction with the content area addition element 214, the digital merchant content system 100 can add a new content area to the user interface 204 and add interactive elements to the new content area. Moreover, the digital merchant content system 100 can provide a variety of options for modifying visual appearance of the custom merchant content template, such as color, size of interactive elements, arrangement of interactive elements, or order of interactive elements.

In this manner, the digital merchant content system 100 can generate a custom merchant content template that includes interactive elements specified by a merchant. In particular, the digital merchant content system 100 can generate a custom merchant content template with a variety of customized elements that include specified media content items. Moreover, the digital merchant content system 100 can generate a custom merchant content template that comprises unpopulated elements that the digital merchant content system 100 can populate at a later time (e.g., elements that permit the digital merchant content system 100 to uniquely tailor the elements to individual users and products in real-time). Accordingly, the digital merchant content system 100 can generate custom merchant content templates that reflect a merchant's own unique style, branding, and messaging, while also containing unpopulated elements that can be tailored and modified at a later time to variable circumstances of the merchant and/or other users.

For example, FIG. 2B illustrates the user interface 204 that is tailored and modified by a merchant in accordance with one or more embodiments. In particular, as shown in FIG. 2B, the user interface 204 includes a digital video interactive element 220 within the content area 206, and a plurality of digital image elements 222a-222n within the content area 208. Furthermore, the user interface 204 includes a new content area 224 with a product display layout 226 comprising a plurality of unpopulated elements 228a-228e.

The digital merchant content system 100 generates the user interface 204, as shown in FIG. 2B, based on user interaction by a merchant. In particular, the digital merchant content system 100 generates the digital video interactive element 220 based on user interaction with a selectable option for adding a digital video interactive element together with a user interaction by the merchant selecting a media content item to include with the digital video interactive element 220. Furthermore, the merchant interacts with the user interface 204 to locate, arrange, and/or re-size the digital video interactive element 220 and/or the content area 208.

Similarly, the digital merchant content system 100 generates the plurality of digital image elements 222a-222n based on user interaction by a merchant specifying the digital image elements 222a-222n. Specifically, the merchant interacts with selectable options for adding the digital image elements 222a-222n and adding digital images to the digital image elements 222a-222n. Moreover, based on user interaction, the digital merchant content system 100 locates, arranges, and sizes the digital image elements 222a-22n and/or the content area 208.

Further, the digital merchant content system 100 adds the content area 224 and the unpopulated product display layout 226 based on user interaction by a merchant. In particular, the digital merchant content system 100 adds the content area 224 based on user interaction with the content area addition element 214. Moreover, the digital merchant content system 100 adds the unpopulated product display layout 226 and corresponding unpopulated elements 228a-228e as specified by the merchant (e.g., based on user interaction with selectable options for adding the unpopulated elements).

It will be appreciated that the unpopulated product display layout 226 can take a variety of forms. For example, the unpopulated product display layout 226 can comprise a grid layout, a scrolling carousel-like display, a single product view, and/or a thumbnail list of products. Moreover, although FIG. 2B illustrates only one unpopulated product display within the custom merchant content template, it should be appreciated that a user can include a plurality of unpopulated product display layouts in a custom merchant content template.

The digital merchant content system 100 positions, arranges, and/or re-sizes the unpopulated elements 228a-228e based on user interaction by the merchant. For instance, the merchant re-sizes and moves the unpopulated element 228c (e.g., such that the unpopulated element 228c is larger than, and positioned in the middle of, the unpopulated elements 228a, 228b, 228d, and 228e). It will also be appreciated that although FIG. 2B illustrates a particular arrangement of content areas, interactive elements, and unpopulated elements, the digital merchant content system 100 can generate a variety of different elements and arrangements. Indeed, based on user interaction, the digital merchant content system 100 can generate any number of content areas, can re-order various content areas, add any variety of interactive elements, and/or upload a variety of media content items.

Furthermore, it will be appreciated that although the embodiment described in relation to FIG. 2B includes various interactive elements based on user interaction from a merchant, in one or more embodiments, the digital merchant content system 100 automatically provides (or suggests) various interactive elements. For example, in one or more embodiments, the digital merchant content system 100 can suggest forms for custom merchant content templates that include elements in a predetermined order and/or arrangement. A merchant can then utilize the form as a starting point to generating a custom merchant content template (e.g., by adding media content items, re-arranging interactive elements, and otherwise customizing the form).

Furthermore, although the user interface 204 of FIG. 2B illustrates interactive elements corresponding to a single custom merchant content template, it will be appreciated that the digital merchant content system 100 can generate a plurality of custom merchant content templates. Indeed, the digital merchant content system 100 can generate a plurality of custom merchant content templates with different interactive elements and different media content items.

In addition to specifying interactive elements and media content items in generating a custom merchant content template, as described above, the digital merchant content system 100 can also obtain a product feed and merchant preferences in generating a custom merchant content template. For example, FIG. 2C illustrates the user interface 204 with a product feed selection element 240 and a merchant preference selection element 242.

Upon user interaction with the product feed selection element 240, the digital merchant content system 100 can obtain one or more product feeds. For example, upon user interaction with the product feed selection element 240, the digital merchant content system 100 can provide a user interface element that allows a merchant to identify a product feed. For example, the merchant can identify a location of an updating product feed database (e.g., a database stored on a merchant server or a third-party server). Upon specifying the location of the updating product feed database, the digital merchant content system 100 can access the updating product feed database and periodically check the updating product feed database for updated information. Furthermore, upon user interaction with the product feed selection element 240, the merchant can also identify a website (e.g., a URL) that includes merchant products. In response to the merchant identifying a website, the digital merchant content system 100 can navigate to the identified website and gather product information. Moreover, the digital merchant content system 100 can periodically check the website for updated product information.

Moreover, as discussed above, a user can also add merchant preferences in generating a custom merchant content template. In particular, in relation to FIG. 2C, upon user interaction with the merchant preference selection element 242, the digital merchant content system 100 can receive one or more merchant preferences (e.g., provide interface elements for user input of merchant preferences). The digital merchant content system 100 can receive a variety of types of merchant preferences. Indeed, the digital merchant content system 100 can receive merchant preferences regarding merchant content templates, populating unpopulated elements, targeted users, triggering events (e.g., triggering events for providing particular templates or populating particular elements), or other information. For example, the digital merchant content system 100 can receive merchant preferences regarding how to select or utilize the plurality of merchant content preferences.

To illustrate, a merchant may create one or more main custom merchant content templates and one or more auxiliary custom merchant content templates that describe specific products. Moreover, the merchant can specify a preference to utilize the one or more main custom merchant content templates over the auxiliary custom merchant content templates. For instance, the merchant can specify that the digital merchant content system 100 should initially utilize the main custom merchant content template to familiarize users with the merchant before utilizing auxiliary custom merchant content templates (e.g., utilize a main custom merchant content template as an initial landing page for each user upon selection of an advertisement in a social network feed).

Moreover, a merchant can provide merchant preferences indicating circumstances for utilizing particular custom merchant content templates. For example, a merchant can indicate a merchant preference to utilize a first custom merchant content template during a first period of time (e.g., utilize a custom merchant content template with spring themes in April) and a second custom merchant content template during a second period of time (e.g., utilize a custom merchant content template with winter themes in January). Similarly, a merchant can specify a target audience for particular custom merchant content templates. In particular, the merchant can provide merchant content preferences indicating user characteristics corresponding to a particular custom merchant content template. For example, the merchant can provide a merchant preference to utilize a first custom merchant content template for male users between ages 5 and 17 and a second custom merchant content template for male users older than 18.

In addition to merchant preferences in relation to selecting custom merchant content templates, the digital merchant content system 100 can also receive merchant preferences in relation to unpopulated elements within a custom merchant content template. For example, a merchant can specify what products to utilize in populating an unpopulated product display layout in a custom merchant content template. More specifically, a merchant can specify merchant preferences that guide selection by the digital merchant content system 100 of particular products to utilize in populating an unpopulated product display layout.

For example, a merchant can specify a merchant preference for displaying products that are on sale prior to products that are not on sale. Similarly, a merchant can specify a merchant preference for displaying a particular group of products over another group of products. In addition, a merchant can specify a merchant preference comprising a target audience for particular products. For example, a merchant can specify that a first product is targeted to users in a first location (e.g., sports apparel for a team located in a first city), and a second product is targeted to users in a second location (e.g., sports apparel for a team located in a second city). In other words, the merchant can specify a merchant preference for populating an unpopulated product display layout with particular products based on particular user characteristics.

Further, a merchant can specify a merchant preference comprising circumstances in which to populate a particular unpopulated element with particular products (i.e., media content items corresponding to particular products). For example, a merchant can specify that the digital merchant content system 100 should populate an unpopulated product display element with a particular product during particular time periods (e.g., hours of the day, days of the week, months of the year).

In addition to providing merchant preferences corresponding to a custom merchant content template, as described above, in one or more embodiments, the digital merchant content system 100 can also store a custom merchant content template. In particular, as shown in FIG. 2C, the user interface includes a save element 244. Upon user interaction with the save element 244, the digital merchant content system 100 can store the custom merchant content template and associate the template with a corresponding merchant.

Figure 3B:
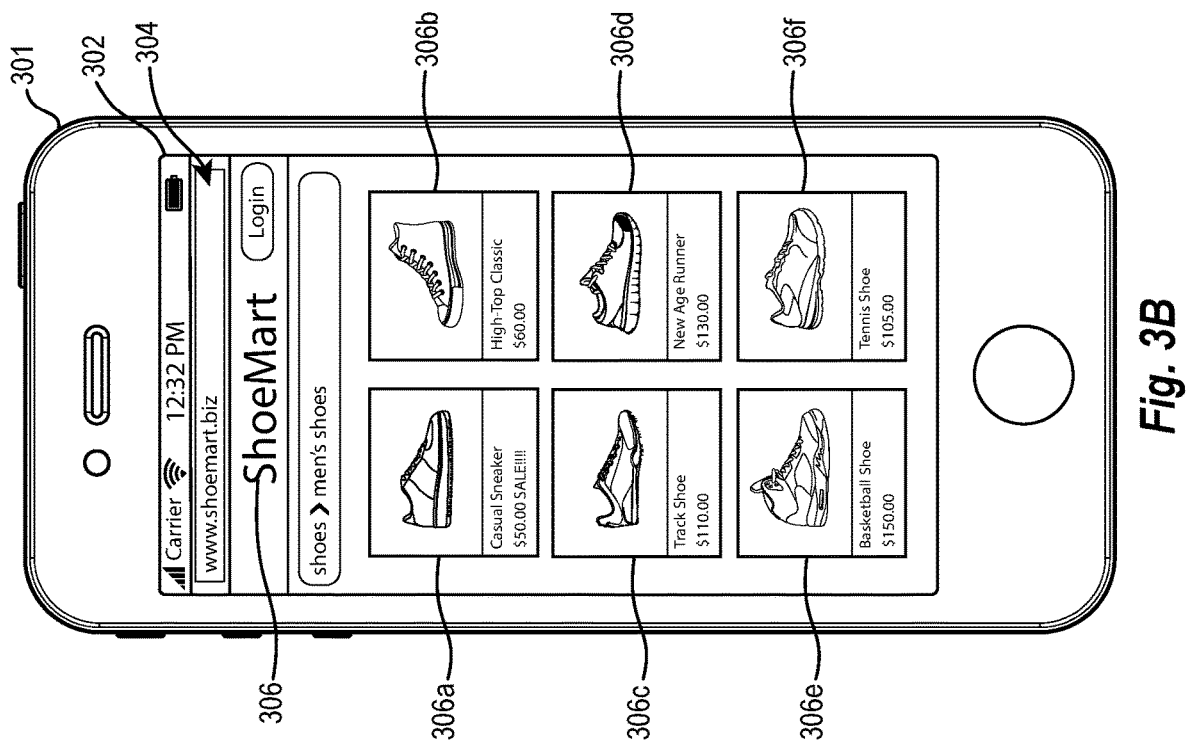

As mentioned above, in one or more embodiments, the digital merchant content system 100 receives a product feed in conjunction with creating a custom merchant content template. Specifically, as discussed above, the product feed can take a variety of forms, including an updating database (or other file) or a website containing products associated with a merchant. For example, FIGS. 3A-3B illustrate representations of product feeds in accordance with one or more embodiments.

In particular, FIG. 3A illustrates a representation of an updating product feed database in accordance with one or more embodiments. Specifically, FIG. 3A illustrates a database 300 in the form of a table with a plurality of fields arranged in rows and columns. As shown in FIG. 3A, the database 300 includes a variety of types of product information. In particular, the database 300 includes rows describing product name, price, category, group, sale status, sale price, color, stock status, etc. The database 300 can include a variety of additional types of product information. For example, the database 300 can include media content items corresponding to products (e.g., a location of product image files or product video files), product specifications, product descriptions, product locations, product shipping items, product timing information (e.g., information indicating a time corresponding to seasonal products), product sale information (e.g., sale volume or sale rank compared to other products), or other product information.

The product database 300 can change periodically. For example, a merchant can periodically modify the product database 300 to reflect updated information (e.g., a particular product goes out of stock). As the database 300 changes, the digital merchant content system 100 can obtain updates reflecting modifications in the product feed. For example, in one or more embodiments, the digital merchant content system 100 periodically checks for updates to the database 300. To illustrate, the digital merchant content system 100 can check for updates utilizing a certain schedule (e.g., once a minute, twice an hour, or once a day). Similarly, the digital merchant content system 100 can check for updates each time the digital merchant content system 100 generates a custom merchant content interface corresponding to the merchant (e.g., when the digital merchant content system 100 utilizes a custom merchant content template corresponding to the merchant). Similarly, in one or more embodiments, the digital merchant content system 100 automatically receives updates when modifications are made to the database 300. For example, the digital merchant content system 100 can detect when a merchant makes modifications to the database 300, and in response, obtain a revised version of the database 300.

In addition to utilizing an updating database, as mentioned previously, in one or more embodiments, the digital merchant content system 100 utilizes a merchant website as a product feed. For example, FIG. 3B illustrates obtaining product information from a product feed that comprises a merchant website. In particular, FIG. 3B illustrates a computing device 301 with a user interface 302 displaying a website 304 associated with a merchant (i.e., "www.shoemart.biz"). In particular, the website 304 includes a plurality of elements 306a-306f (i.e., product advertisements).

As discussed above, the digital merchant content system 100 can parse a website to identify product information. The digital merchant content system 100 can utilize a variety of methods to parse a website. For example, in one or more embodiments, the digital merchant content system 100 can identify the HTML of a website and isolate product information from the HTML. To illustrate, the digital merchant content system 100 can identify HTML tags identifying a particular product and corresponding product attributes (e.g., names, images, descriptions, price information, sale information, stock status, groups, descriptions) associated with a product.

In addition to HTML analysis, the digital merchant content system 100 can utilize other approaches to identify product information from a website. For instance, the digital merchant content system 100 can render an image of a website, and analyze the image (i.e., rendering) to determine product information. For example, the digital merchant content system 100 can render an image of a website and utilize optical character recognition technology or object recognition technology to identify product information.

In relation to FIG. 3B, the digital merchant content system 100 identifies product information from the website 304. In particular, the digital merchant content system 100 identifies a name associated with a product based on the element 306a (e.g., "Casual Sneaker"). Additionally, the digital merchant content system 100 identifies an image associated with the product (e.g., the image included in the element 306a, a sale status (e.g., "SALE!!!"), and a sale price (e.g., "$50.00"). Similarly, the digital merchant content system 100 identifies a name, image, and price corresponding to the elements 306b-306f.

As mentioned above, the digital merchant content system 100 can also identify product groups from a website. For example, the digital merchant content system 100 can determine that the products portrayed in the elements 306a-306f correspond to shoes. Similarly, the digital merchant content system 100 can determine that the products 306c-306f (i.e., "Track Shoe," "New Age Runner," "Basketball Shoe," and "Tennis Shoe") correspond to a group of athletic shoes.

The digital merchant content system 100 can determine product groups based on a variety of factors. For example, the digital merchant content system 100 can determine product groups based on a common description or common terms corresponding to a product (e.g., "Track Shoe" and "New Age Runner"). The digital merchant content system 100 can also determine product groups based on proximity within a website (e.g., the elements 306e, 306f are adjacent on the website 304), based on falling within the same field of a website (e.g., two products falling within the same boundary on a web site), based on an image of the products portrayed on the website (e.g., image portrays two objects of the same type), or other factors.

In addition to identifying product groups, the digital merchant content system 100 can also identify a product order from a website. For example, in relation to FIG. 3B, the digital merchant content system 100 can determine that the website 304 displays the element 306a first, the element 306b second, the element 306c third, etc. In relation to FIG. 3B, the digital merchant content system 100 identifies a product order based on the position of the elements 306a-306b on the website 304 starting at the top of the web page and proceeding from left to right. It will be appreciated that the digital merchant content system 100 can utilize a different approach in identifying a product order. For example, in one or more embodiments, the digital merchant content system 100 identifies a focal point of a website and identifies a product order based on the focal point (e.g., products closest to the focal point first, and products further from the focal point second).

The digital merchant content system 100 can also determine a product emphasis from a website (e.g., a product emphasis score). For example, the digital merchant content system 100 can determine product emphasis based on size of an element. To illustrate, if a merchant website includes a large digital image of a particular product (i.e., larger than other product images), the digital merchant content system 100 can determine that the website places a higher emphasis on the particular product than other products (e.g., the digital merchant content system 100 can assign a higher emphasis score to the particular product). Similarly, if a web site contains a picture of a first product and no picture of a second product, the digital merchant content system 100 can determine a heightened product emphasis on the first product.

Moreover, the digital merchant content system 100 can detect modifications to a product feed comprising a website. In particular, the digital merchant content system 100 can detect updates to a product feed by identifying modifications to a website corresponding to a merchant. For example, the digital merchant content system 100 can detect changes in content (e.g., different text, images, or products), size, arrangement of elements, order, or emphasis on a website. Based on the detected changes, the digital merchant content system 100 can update product information. For example, the digital merchant content system 100 can identify product prices, sale status, product order, product groups, product stock status, emphasis, or other product information based on updates to a website.

Although FIGS. 3A-3B illustrate a single product feed, it will be appreciated that the digital merchant content system 100 can utilize a plurality of product feeds. For example, the digital merchant content system 100 can access a plurality of databases comprising product information (e.g., databased for different product lines or companies) and/or a plurality of websites (e.g., websites for different product lines or companies).

Figure 4C:
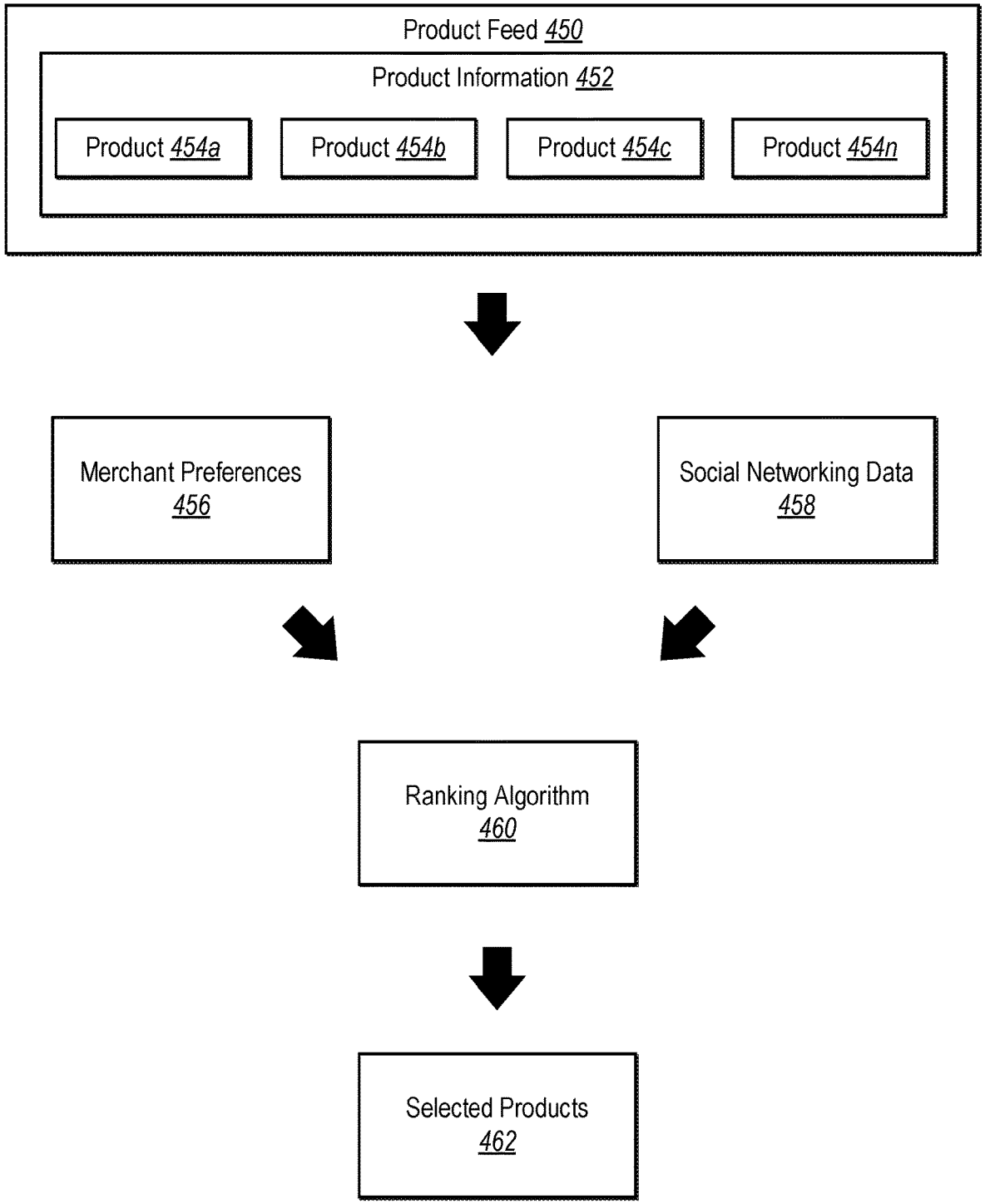
FIG. 4C illustrates an example sequence flow for selecting products to populate a custom merchant content template in accordance with one or more embodiments.

FIGS. 4A-4D illustrate generating and presenting a custom merchant content interface in accordance with one or more embodiments. In particular, FIG. 4A illustrates a computing device 400 with a touchscreen 402 displaying a user interface 404 corresponding to a social networking application 406 (e.g., a social networking application corresponding to the social networking system 104). Moreover, the user interface 404 of the social networking application 406 includes a social networking feed 408. As illustrated, the social networking feed 408 comprises one or more social networking posts from other users (e.g., a message from Mike Smith regarding a weight set). In addition, the social networking feed includes a selectable element 410. In particular, the selectable element 410 comprises an advertisement for a merchant (i.e., "Solitude Camping").

As mentioned above, in one or more embodiments, upon user interaction with a selectable element in a social networking feed, the digital merchant content system 100 can determine a custom merchant content template and generate a custom merchant content interface. Specifically, the digital merchant content system 100 can identify a merchant corresponding to the selectable element and identify one or more custom merchant content templates corresponding to the merchant. For example, as shown in FIG. 4B, upon selection of the selectable element 410, the digital merchant content system 100 identifies a custom merchant content template 420. Specifically, the digital merchant content system 100 identifies a merchant corresponding to the selectable element 410, identifies an account corresponding to the merchant (i.e., on the social networking system 104), and then identifies the custom merchant content template 420 associated with the account.

As shown in FIG. 4B, the custom merchant content template 420 comprises a plurality of content areas 422, 424, and 426. In particular, the content area 422 includes an element 428 that comprises a digital video; the content area 424 includes an element 320 that comprises a digital image (e.g., an interactive map); and the content area 426 includes an unpopulated product display layout 432. Moreover, the unpopulated product display layout 432 comprises a plurality of elements 432a-432h that are unpopulated (i.e., the plurality of elements 432a-432h do not include associated media content items).

As described above, in one or more embodiments, the digital merchant content system 100 utilizes a custom merchant content template to generate a custom merchant content interface. Specifically, in one or more embodiments the digital merchant content system 100 populates an unpopulated product display layout in a custom merchant content template based on a product feed, merchant preferences, and/or social networking system data to generate a custom merchant content interface. More specifically, in one or more embodiments, the digital merchant content system 100 utilizes a ranking algorithm based on a product feed, merchant preferences, and/or social networking system data to select products to include in an unpopulated product display layout.

For example, FIG. 4C illustrates a representation of selecting products to include in an unpopulated product display layout in accordance with one or more embodiments. In particular, FIG. 4C illustrates a representation of a product feed 450 (e.g., the database 300 and/or the web site 304) comprising product information 452 regarding a plurality of products 454a-454n. Furthermore, FIG. 4C illustrates a representation of merchant preferences 456 and social networking system data 458.

As shown, the digital merchant content system 100 provides the product feed 450, the merchant preferences 456, and the social networking system data 458 to a ranking algorithm 460 and the ranking algorithm 460 generates selected products 462. In particular, the ranking algorithm 460 generates the selected products 462 to utilize in populating unpopulated elements in the custom merchant content template 420. In one or more embodiments, the ranking algorithm 460 calculates a score corresponding to each product 454a-454n. In particular, the ranking algorithm 460 applies criteria to each of the products 454a-454n and calculates a score corresponding to each of the products 454a-454n based on whether (and/or to what extent) each of the products 454a-454n satisfy the criteria.

The ranking algorithm 460 can apply a variety of criteria depending on the particular embodiment. In particular, the ranking algorithm 460 can apply criteria that incorporate product information, social networking data, and/or merchant preferences. For example, in one or more embodiments, the ranking algorithm 460 applies criteria directed to whether a product satisfies certain merchant preferences. Similarly, the ranking algorithm can apply criteria directed to product performance (e.g., product sales, product clicks, product views, product discussion from social networking system data or a product feed), user characteristics (e.g., demographic information, location information, or user history), product information (e.g., a product order on an existing website, product emphasis, sale status, stock status from a product feed), or a combination of such criteria.

In addition, and as briefly mentioned above, the ranking algorithm 460 can utilize merchant preferences as criteria in selecting a product. Indeed, a merchant can provide a variety of merchant preferences to guide the digital merchant content system 100 in generating custom merchant content interfaces. The ranking algorithm 460 can identify such merchant preferences and assign a score to each of the products 454a-454n based on whether (or to what extent) the products 454a-454n satisfy the merchant preferences 456. To illustrate, the merchant preferences 456 can include a preference to select a first product during a first period of time (e.g., a yellow dress during April), and select a second product during a second period of time (e.g., black dress during January). The ranking algorithm 460 can determine the current time (e.g., April), and assign a score based on whether a product satisfies the criteria (e.g., apply a higher score to the yellow dress).

In addition to merchant preferences, the ranking algorithm 460 can also apply criteria directed to product performance. For example, in one or more embodiments, the digital merchant content system 100 analyzes the social networking system data 458 to identify metrics regarding product performance. To illustrate, the digital merchant content system 100 can determine a number of clicks a product receives on the social networking system (e.g., number of advertisements selected for a particular product), a number of purchases of a product via the social networking system, a number of views of a product via a social networking system, or a time duration that users view a product via a social networking system. The ranking algorithm 460 can generate a score based on the extent to which a particular product generates clicks, views, purchases, and/or viewed time via the social networking system.

Similarly, the digital merchant content system 100 can determine a level of discourse regarding a product via a social networking system. For example, the digital merchant content system 100 can determine (from the social networking system data 458) a number of posts, comments, messages, or other electronic communications that discuss a particular product. The ranking algorithm 460 can generate a score based on the extent to which a particular product is discussed on the social networking system.

The digital merchant content system 100 can also determine metrics of product performance via the product feed 450. For example, the product feed 450 can include updating information regarding product sales, product popularity, or other metrics (e.g., clicks on other websites, online purchases, or survey data). The ranking algorithm 460 can generate a score based on the extent to which a particular product corresponds to increased sales, popularity, clicks, purchases, or other metrics from the product feed 450.

In addition, the ranking algorithm 460 can also assign a score based on user characteristics (e.g., user characteristics corresponding to the user of the computing device 400) from the social networking system data 458. For instance, in one or more embodiments, the ranking algorithm 460 can determine a correspondence between a particular product and user characteristics. Moreover, the ranking algorithm 460 can generate a score based on the correspondence between the particular product and the user characteristics. For example, the digital merchant content system 100 can determine (via the social networking system data 458, the product feed 450, and/or merchant preferences 456) that users with one or more user characteristics (e.g., users in California) prefer a particular product (e.g., a swimsuit). The ranking algorithm 460 can assign a higher score to the particular product based on the extent to which a user of the computing device 400 shares the one or more user characteristics (i.e., assign a higher score to the swimsuit when a user is from California).

It will be appreciated that the ranking algorithm 460 can utilize criteria directed to a variety of user characteristics. For example, the ranking algorithm can utilize criteria directed to location, user history (e.g., a user's previous views, purchases, or clicks), demographic information, computing device information (i.e., device type, type of operating system, browser utilized, or software installed) or other user characteristics.

In addition to user characteristics, the ranking algorithm 460 can also utilize criteria directed to a variety of metrics reflected in the product information 452 from the product feed 450. For example, as mentioned previously, the product information 452 can include sale status (i.e., whether a product is on sale), stock status (i.e., whether a product is in stock), price (i.e., retail price or sale price), or other product attributes. The ranking algorithm 460 can utilize criteria directed to such metrics in the product information 452 to generate a score corresponding to each product 454a-454n (i.e., higher score for products on sale or lower score for products out of stock).

Moreover, the ranking algorithm 460 can utilize information product groups to generate the selected products 462. For example, the ranking algorithm 460 can assign a higher score to products that belong to the same product group. To illustrate, in one or more embodiments, the ranking algorithm 460 determines that five of the top ten highest scoring products belong to the same product group (e.g., five of the highest scoring products are athletic shoes from a merchant that sells shoes). In response, the ranking algorithm 460 can increase the score of the five identified products (e.g., increase the score corresponding to the five athletic shoes).

Rather than increasing a score in relation to products in the same product group, in one or more embodiments, the ranking algorithm 460 identifies a product with a highest score and then selects additional products from the same product group. For example, the ranking algorithm can determine that the product 454a has the highest score and the product 454b belongs to the same product group. In one or more embodiments, the ranking algorithm 460 selects the product 454b because it belongs to the same product group as the product 454a.

In addition to applying criteria directed to product groups, the ranking algorithm 460 can also apply criteria directed to a product order from the product information 452. For example, as described above, the digital merchant content system 100 can determine a product order from an existing merchant web site and store the product order in the product information 452. The ranking algorithm 460 can utilize the product order to identify selected products 462.

For example, in one or more embodiments, the ranking algorithm 460 can generate a score based on the product order. To illustrate, the ranking algorithm 460 can determine from the product information 452 that the product 454a appears first on a website of a merchant, while the product 454n appears last on the website of a merchant. The ranking algorithm 460 can increase a score corresponding to the product 454a relative to a score corresponding to the product 454n based on the determination that the product 454a appears before the product 454b on the website.

Rather than assigning a score based on product order, in one or more embodiments, the ranking algorithm 460 can mirror a product order. For example, the ranking algorithm can determine a product order from a web site of a merchant and utilize the same product order in generating the selected products 462. The ranking algorithm 460 can also apply criteria directed to product emphasis from the product information 452. For example, as described above, the digital merchant content system 100 can determine a product emphasis corresponding to products on a web site of a merchant and store the product emphasis in the product information 452. The ranking algorithm can utilize the product emphasis to identify the selected products 462.

To illustrate, the digital merchant content system 100 can determine that the product 454a is portrayed on a website with a large digital image in a bold font; determine that the product 454b is portrayed on the website with a small digital image in a regular font; and determine that the product 454c is mentioned on the website but not portrayed in a digital image. In response, the ranking algorithm 460 can assign a higher score to the product 454a (based on a determination of a higher emphasis on the website), a lower score to the product 454b (based on a determine of a lower emphasis on the website), and an even lower score to the product 454c (based on a determination of an even lower emphasis on the website).

The digital merchant content system 100 can also select products based on contents of one or more digital merchant content templates. In particular, in one or more embodiments, the digital merchant content system 100 identifies a correspondence between a digital merchant content template and one or more products. The ranking algorithm 460 can generate a score based on whether a product corresponds to a particular digital merchant content template. To illustrate, the digital merchant content system 100 can determine that a digital merchant content template is targeted to a particular audience (e.g., senior citizens). The digital merchant content system 100 can also determine that a particular product is utilized more frequently by the particular audience (e.g., dentures). In response, the ranking algorithm 460 can assign a higher score to the particular product.

As shown in FIG. 4C, upon generating a score for the products 454a-454n, the ranking algorithm 460 can identify the selected products 462. In particular, in one or more embodiments, the ranking algorithm 460 identifies the selected products 462 by comparing scores corresponding to the products 454-454n. For example, the ranking algorithm 460 can rank the products 454a-454n by score and then select a number of products corresponding to a number of unpopulated elements in an unpopulated product display layout (i.e., the highest ranked products needed to fill the unpopulated elements). In this manner, one or more embodiments of the digital merchant content system 100 selects products to utilize in populating unpopulated elements in a custom merchant content template to generate a custom merchant content interface.

Figure 4D:
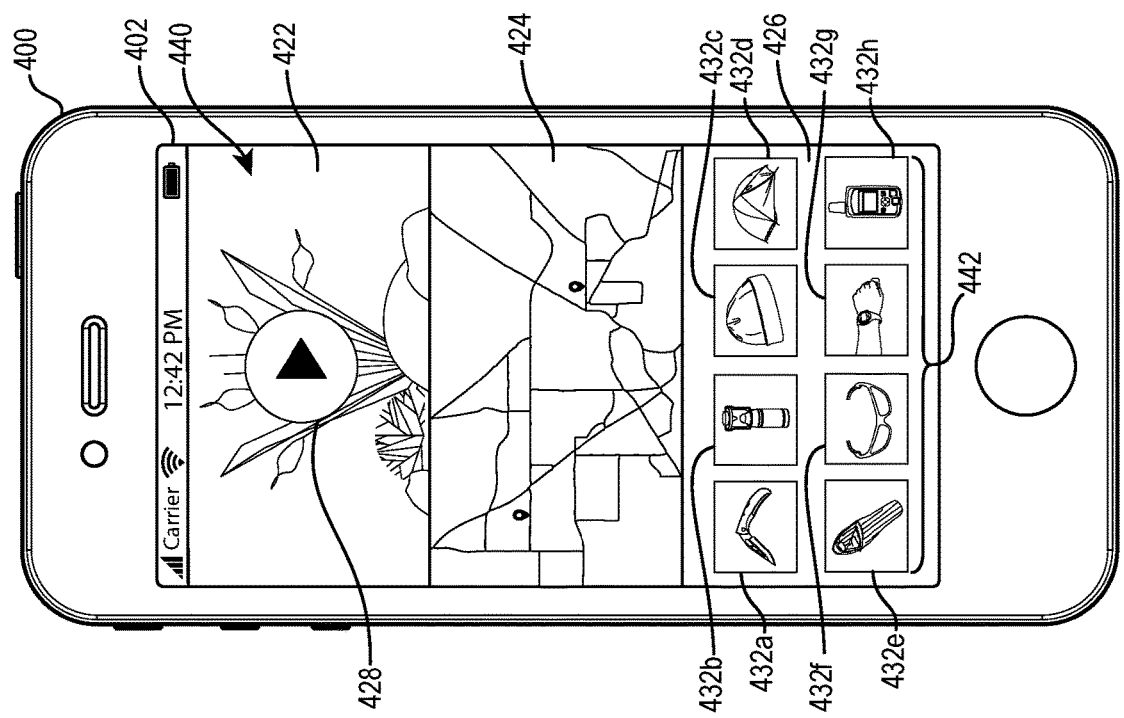
FIG. 4D illustrates the computing device of FIG. 4A displaying a custom merchant content interface in accordance with one or more embodiments.

For example, FIG. 4D illustrates generating a custom merchant content interface by populating a custom merchant content template. In particular, FIG. 4D illustrates the computing device 400 with the touchscreen 402 upon selection of the selectable element 410. As shown in FIG. 4D, the touchscreen 402 displays the custom merchant content interface 440. Specifically, the custom merchant content interface 440 comprises the first content area 422 and the element 428; the second content area 424 and the element 430; and the third content area 426 with a populated product display layout 442. Moreover, the populated product display layout 442 comprises the elements 432a-432h, populated with media content items (i.e., pictures of the selected products 462).

In relation to the embodiment of FIG. 4D, the digital merchant content system 100 utilizes the custom merchant content template 420 to generate the custom merchant content interface 440. In particular, the digital merchant content system 100 identifies the elements 432a-432h of the unpopulated product display layout 432. Utilizing the product feed 450, the merchant preferences 456, and the social networking system data 458, the digital merchant content system 100 identifies the selected products 462. The digital merchant content system 100 then utilizes the selected products 462 to populate the elements 432-432h and generate the custom merchant content interface 440.

More specifically, upon identifying the selected products 462, the digital merchant content system 100 identifies media content items corresponding to the selected products 462 (e.g., from the product feed 450). Indeed, as described above, in one or more embodiments, the product feed 450 comprises media content items (e.g., links to digital images or digital videos) corresponding to the products 454a-454n. Accordingly, the digital merchant content system 100 can utilize the product feed 450 to obtain media content items corresponding to the selected products 462. Moreover, the digital merchant content system 100 can associate the media content items with the elements 432a-432h (i.e., populate the elements 432a-432h).

The digital merchant content system 100 can identify any variety of media content items to utilize in populating an unpopulated element in an unpopulated product display layout. In relation to the embodiment of FIG. 4D, the digital merchant content system 100 identifies digital images corresponding to the selected products 462. In other embodiments, the digital merchant content system 100 can identify digital videos, digital text (e.g., product name, product price, or sale language) or other media content item to populate an unpopulated product display layout.

Notably, because the digital merchant content system 100 populates the product display layout 442 and the individual elements 432a-432h based on the product feed 450, the social networking system data 458, and/or merchant preferences, the elements 432a-432h include media content items uniquely tailored to a user of the computing device 400. Moreover, the elements 432a-432h include media content items that reflect up-to-date information regarding the merchant's products.

Moreover, because the product display layout 442 is based on the product feed 450 and social networking system data 458, the digital merchant content system 100 can modify the product display layout 442 as the digital merchant content system 100 receives updates to the product feed 450 and/or the social networking system data 458. For example, the digital merchant content system 100 can receive an update to the product feed 450 and/or the social networking system data 458, and, in response, the digital merchant content system 100 can populate the elements 432a-432h with different media content items.

To illustrate, the digital merchant content system 100 can receive an update to the product feed 450 indicating that a first product is out of stock. Similarly, the digital merchant content system 100 can receive additional social networking system data 458 indicating that a second product is generating increased sales. In response, the digital merchant content system 100 (e.g., via the ranking algorithm 460) can modify the product display layout 442 (e.g., to remove the first product that is out of stock and to add the second product that is generating increased sales). Accordingly, even if a user of the computing device 400 selects the selectable element 410 at a later time, the digital merchant content system 100 can generate a different custom merchant content interface with a different product display layout.

Although the embodiments of FIGS. 4A-4D describe creating the custom merchant content interface 440 upon user interaction with the selectable element 410, it will be appreciated that the digital merchant content system 100 can generate custom merchant content interfaces at different times. For example, rather than generating the custom merchant content interface 440 in response to selection of the selectable element 410, the digital merchant content system 100 can generate the custom merchant content interface 440 upon receiving the product feed 450, upon identifying social networking system data 458, upon generating the selectable element 410, or at some other time.

Furthermore, although FIGS. 4A-4D illustrate generating the custom merchant content interface 440 from a single custom merchant content template, in one or more embodiments, the digital merchant content system 100 selects a custom merchant content template from a plurality of custom merchant content templates to generate a custom merchant content interface. For example, FIGS. 5A-5C illustrate selecting a custom merchant content template from a plurality of custom merchant content templates and generating a custom merchant content interface from the selected custom merchant content template.

Figure 5A:
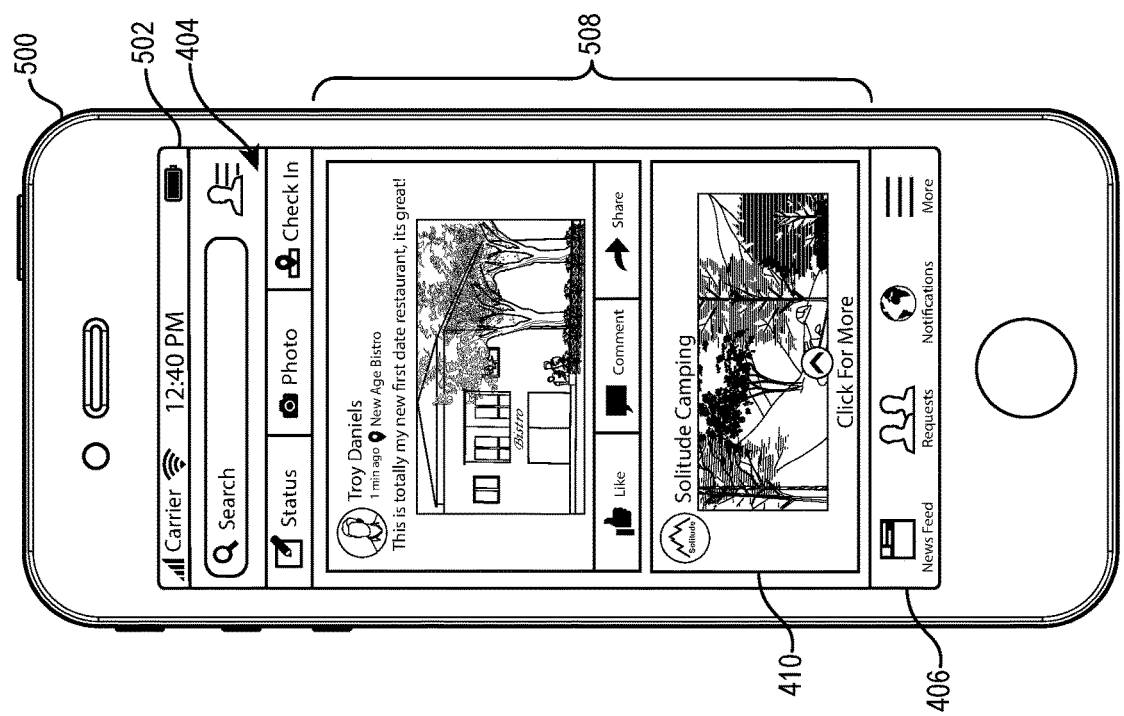

Specifically, FIG. 5A illustrates a computing device 500 with a touchscreen 502 displaying the user interface 404 corresponding to the social networking application 406. As illustrated in FIG. 5A, the user interface 404 includes a social networking feed 508 comprising a plurality of social networking posts from other users of a social networking system. In addition, the social networking feed 508 includes the selectable element 410.

Figure 5B:
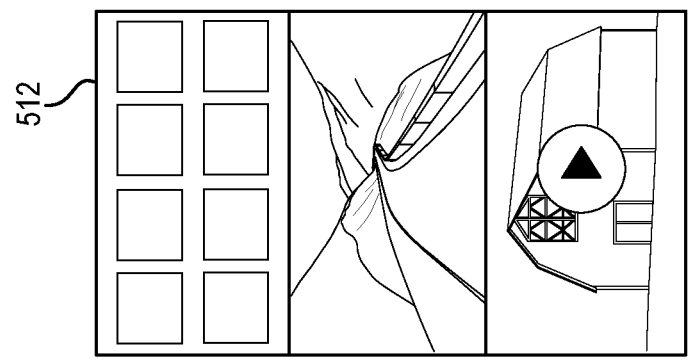
Figure 5B:
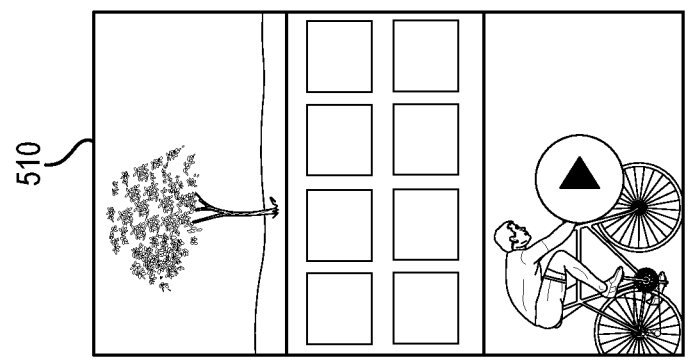
Figure 5B:
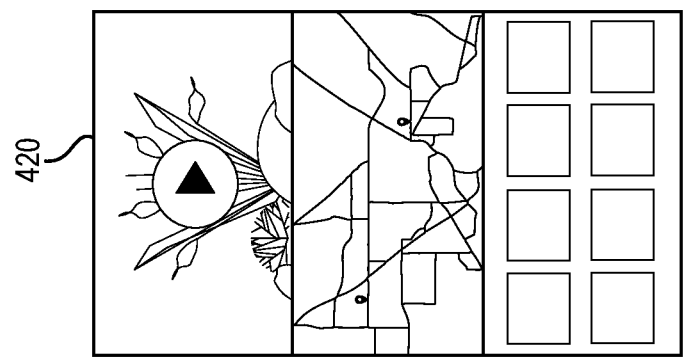

As shown in FIG. 5B, upon user interaction with the selectable element 410, the digital merchant content system 100 identifies the custom merchant content template 420, a second custom merchant content template 510, and a third custom merchant content template 512. The digital merchant content system 100 can select a custom merchant content template from the plurality of custom merchant content templates 420, 510, 512 (e.g., based on merchant preferences, a product feed, and/or social networking system data).

The digital merchant content system 100 can utilize a variety of methods to select a custom merchant content template. In one or more embodiments, the digital merchant content system 100 utilizes a ranking algorithm (i.e., similar to the ranking algorithm 460) to determine a score corresponding to each custom merchant content template and select a resulting custom merchant content template. For example, as described previously, a merchant can provide merchant preferences corresponding to one or more custom merchant content templates (e.g., merchant preferences indicating when to utilize one or more custom merchant content templates).

The digital merchant content system 100 can utilize such merchant preferences to select a custom merchant content template (e.g., generate a score corresponding to a custom merchant content template). To illustrate, in relation to the custom merchant content templates of FIG. 5B, a merchant can provide a merchant preference indicating that the custom merchant content template is an auxiliary merchant content template (e.g., specific to a particular product) and should not be used as the first custom merchant content interface shown to a user. Based on this merchant preference, the digital merchant content system 100 can assign a lower score to the custom merchant content template 512 (or omit the custom merchant content template 512 from selection).

The digital merchant content system 100 can also utilize product information from a product feed to select a custom merchant content template. In particular, the digital merchant content system 100 can utilize product sales, product price, stock status, or sale status to select a custom merchant content template. For example, the digital merchant content system 100 can determine that a custom merchant content template provides information regarding a particular product (or group of products). The digital merchant content system 100 can access a product feed and determine product information regarding the product (e.g., the product is selling well, the product is on sale, the product recently experienced a significant price reduction). The digital merchant content system 100 can utilize the product information in selecting a custom merchant content template (e.g., assign a higher score to the custom merchant content template because it corresponds to a product that is selling well, is on sale, or has a reduced price).

Further, the digital merchant content system 100 can utilize social networking system data to select a custom merchant content template. In particular, the digital merchant content system 100 can select a custom merchant content template based on user characteristics, time, clicks, views, purchases, or other user interaction with a social networking system. For example, in one or more embodiments, the digital merchant content system 100 selects a custom merchant content template from a plurality of custom merchant content templates based on social networking system data regarding one or more of the plurality of custom merchant content templates. Indeed, in one or more embodiments, the digital merchant content system 100 monitors user interactions with a plurality of custom merchant content templates and selects a custom merchant content template based on the monitored user interactions.

By selecting a custom merchant content template based on merchant preferences, a product feed, and/or social networking system data, the digital merchant content system 100 can tailor resulting custom merchant content templates to individual users based on real-time, up-to-date information. Moreover, as already discussed (e.g., in relation to FIGS. 4A-4D) the digital merchant content system 100 can further tailor selected custom merchant content templates to individual users by populating the selected custom merchant content templates based on product feeds and/or social networking system data.

For example, FIG. 5C illustrates the computing device 500 upon selection of the selectable element 410. In particular, FIG. 5C shows that the touchscreen 502 displays a custom merchant content interface 520 based on the custom merchant content template 510. In particular, the custom merchant content interface 520 comprises content areas 522-526. The content area 522 comprises an element 528 that includes a digital image. The content area 530 comprises a product display layout 532 with a plurality of elements 532a-532g; and the content area 526 includes an element 534 that includes a digital video.

In relation to the embodiment of FIG. 5C, the digital merchant content system 100 applies a ranking algorithm and selects the custom merchant content template 510. Upon selecting the custom merchant content template 510, the digital merchant content system 100 populates the custom merchant content template 510 to generate the custom merchant content interface 520. In particular, utilizing the ranking algorithm 460, the digital merchant content system 100 selects products corresponding to the elements 532a-532h and populates the elements 532a-532g with media content items corresponding to the selected products. Accordingly, the digital merchant content system 100 uniquely tailors the custom merchant content interface 520 to the user both in selecting the custom merchant content template 510 from the plurality of custom merchant content templates 420, 510, 512, and populating elements of the custom merchant content interface 520.

Although FIGS. 4A-5C illustrate generating a single custom merchant content interface (i.e., the custom merchant content interface 440 or the custom merchant content interface 520), it will be appreciated that the digital merchant content system 100 can generate a plurality of custom merchant content interfaces. Indeed, as described previously, in one or more embodiments, the digital merchant content system 100 generates a plurality of custom merchant content interfaces from a plurality of custom merchant content templates.

For example, in one or more embodiments, the digital merchant content system 100 generates a plurality of custom merchant content templates based on user input from a merchant. Further, the digital merchant content system 100 selects a subset of custom merchant content templates from the generated plurality of custom merchant content templates. In particular, the digital merchant content system 100 can select a subset of custom merchant content templates based on merchant preferences, a product feed, and/or social networking system data). Moreover, the digital merchant content system 100 can populate the subset of custom merchant content templates to generate a plurality of custom merchant content interfaces. Indeed, for each custom merchant content template in the subset of custom merchant content templates, the digital merchant content system 100 can identify unpopulated elements; select products based on a product feed, social networking system data, and/or merchant preferences; identify media content items corresponding to the selected products; and populate the unpopulated elements with the identified media content items.

Furthermore, in one or more embodiments, the digital merchant content can connect the generated plurality of custom merchant content interfaces. Indeed, in one or more embodiments, the digital merchant content system 100 assigns URLs to each generated custom merchant content interface and dynamically generates links between the plurality of generated custom merchant content interfaces. Specifically, in addition to populating unpopulated elements with media content items, the media content system 100 can also populate unpopulated elements with links to additional custom merchant content interfaces. In this manner, the digital merchant content system 100 can connect a plurality of custom merchant content interfaces to generate a customized, immersive experience for individual users via a social networking system.

Figure 6:
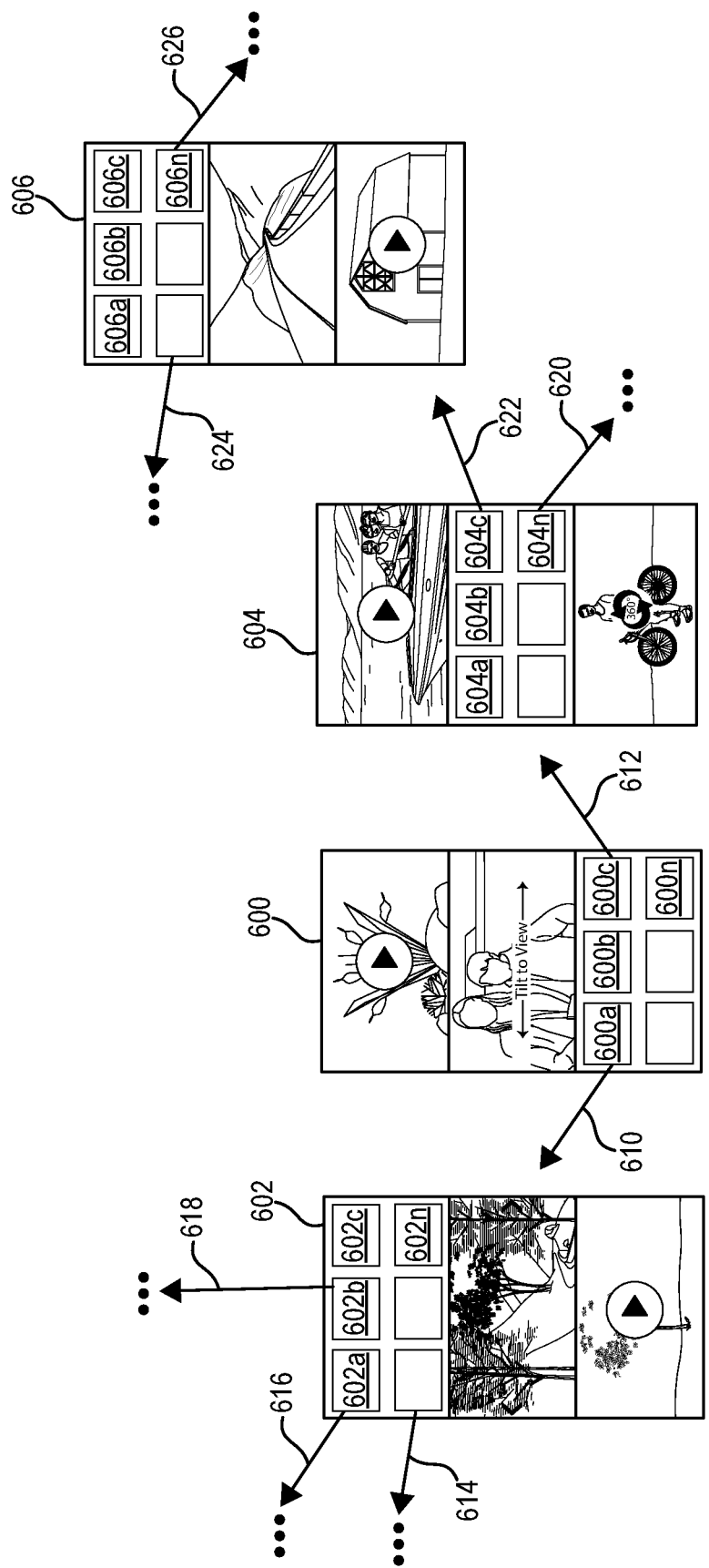
FIG. 6 illustrates a representation of dynamically linking a plurality of custom merchant content interfaces in accordance with one or more embodiments.

For example, FIG. 6 illustrates generating a plurality of custom merchant content interfaces with dynamic links between the plurality of custom merchant content interfaces in accordance with one or more embodiments. In particular, FIG. 6 illustrates a plurality of custom merchant content interfaces 600-606. Moreover, FIG. 6 illustrates that each of the plurality of custom merchant content interfaces 600-606 comprise a product display layout with product elements. In particular, the custom merchant content interface 600 includes product elements 600a-600n, the custom merchant content interface 602 includes product elements 602a-602n; the custom merchant content interface 604 includes product elements 604a-604n; and the custom merchant content interface 606 includes product elements 606a-606n.

The digital merchant content system 100 generates the custom merchant content interfaces 600-606 (and the plurality of product elements 602a-602n) by selecting a subset of custom merchant content templates from a plurality of custom merchant content templates. Moreover, the digital merchant content system 100 then utilizes the subset of custom merchant content templates to generate the plurality of custom merchant content interfaces 600-606.

In particular, the digital merchant content system 100 generates the custom merchant content interfaces 600-606 from a subset of custom merchant content templates by populating the product elements 600a-600n, 602a-602n, and 604a-604n. Specifically, the digital merchant content system 100 selects products corresponding to each of the product elements 600a-600n, 602a-602n, and 604a-604n and populates the product elements 600a-600n, 602a-602n, and 604a-604n with media content items corresponding to the selected products. Moreover, the digital merchant content system 100 assigns URLs to each of generate custom merchant content interfaces.

In addition to populating the product elements 600a-600n, 602a-602n, and 604a-604n, the digital merchant content system 100 also populates some (or all) of the product elements 600a-600n, 602a-602n, and 604a-604n with links to other custom merchant content interfaces. In particular, as illustrated in FIG. 6, the digital merchant content system 100 dynamically generates the links 610-626 between custom merchant content interfaces. The links 610-626 can comprise any digital item that points from one custom merchant content interface to another. For example, the links 610-626 can include an embedded URL that corresponds to another custom merchant content interface.

In one or more embodiments, the digital merchant content system 100 generates the links 610-626 based on a determined correspondence between a product, element, and/or a custom merchant content system interface. For example, as shown in FIG. 6, the digital merchant content system 100 populates the product element 600a with the link 610 to the custom merchant content interface 602. In particular, the digital merchant content system 100 determines a correspondence between the element 600a and the custom merchant content interface 602. Specifically, the digital merchant content system 100 determines that the custom merchant content interface 602 is focused on providing information regarding a particular product. Moreover, the digital merchant content system 100 determines that the product element 600a includes a digital image of the particular product. Accordingly, the digital merchant content system 100 populates the product element 600a with a link to the custom merchant content interface 602, such that a user that clicks on the product element 600a will be directed to the custom merchant content interface 602 that corresponds to the product element 600a.

The digital merchant content system 100 can generate the links 614-626 in a similar manner. For instance, the digital merchant content system 100 identifies a correspondence between the product element 600d and the custom merchant content interface 604 (e.g., the custom merchant content interface 604 addresses a product identified in the product element 600d). Based on the identified correspondence, the digital merchant content generates the link 612 between the product element 600d and the custom merchant content interface 604. In this manner, the digital merchant content system 100 can generate a web of connected custom merchant content interfaces, as shown in FIG. 6

In connecting a plurality of custom merchant content interfaces, the digital merchant content system 100 can identify a main custom merchant content interface (e.g., a landing interface that the custom merchant content interface 100 displays initially upon user interaction with a selectable element on a social networking feed). For example, in relation to FIG. 6, the digital merchant content system 100 selects the custom merchant content interface 600 as the main custom merchant content interface. Thus, upon user selection of a selectable element in a social networking feed, the digital merchant content system 100 initially provides the custom merchant content interface 600. Thereafter, a user can select a product element (e.g., the product element 600a) and navigate to other auxiliary custom merchant content interfaces (e.g., the custom merchant content interface 602) as shown in FIG. 6.

Although FIG. 6 illustrates a particular number of custom merchant content interfaces and a particular number of links, it will be appreciated that the digital merchant content system 100 can generate any number of custom merchant content interfaces and corresponding links. For example, in one or more embodiments, the digital merchant content system 100 generates a link for each product element in each custom merchant content interface.

The digital merchant content system 100 can generate the links 610-626 at a variety of times. For example, in one or more embodiments, the digital merchant content system 100 generates the links 610-626 upon user selection of a selectable element in a social networking feed. In other embodiments, the digital merchant content system 100 generates the links upon receipt of a product feed or upon receipt of social networking system data (e.g., upon identifying user characteristics corresponding to a user).

The digital merchant content system 100 can also modify the links 610-626. For example, the digital merchant content system 100 can modify the links based on an updated product feed, updated social networking system data, or other information. For example, in one or more embodiments, the digital merchant content system 100 detects a selection of the link 610 on the first custom merchant content interface 600. In response, the custom merchant content interface can modify the links 610-626 (and/or the selected custom merchant content templates, and/or the products utilized to populate the product elements) based on the selection. Indeed, the digital merchant content system 100 can update the social networking system data (e.g., user characteristics) based on the selection, and modify the generated custom merchant content interfaces and links based on the updated social networking system data.

Notably, from the perspective of a user of a social networking system, upon selection of a selectable element in a social networking feed, the digital merchant content system 100 can provide a plurality of uniquely tailored and dynamically linked custom merchant content interfaces. The custom merchant content interfaces can include branding, messaging, and information with the look and feel of a local merchant application with customized product elements, a plurality of interactive interfaces, and corresponding links generated based on the unique circumstances of the user and/or up-to-date product information. Moreover, because one or more embodiments of the digital merchant content system 100 store the custom merchant content templates and custom merchant content interfaces locally via a social networking system, the digital merchant content system 100 can provide this functionality within a social networking system (e.g., via a social networking application) quickly, efficiently, and without requiring the user to navigate away from the social networking system to a third-party website.

Moreover, from the perspective of the merchant, the digital merchant content system 100 provides this unique user environment while requiring little investment in time or resources. Indeed, after providing user input to generate a custom merchant content template, in one or more embodiments, the digital merchant content system 100 can provide custom merchant content interfaces 100 based only on an updating product feed.

Figure 7:
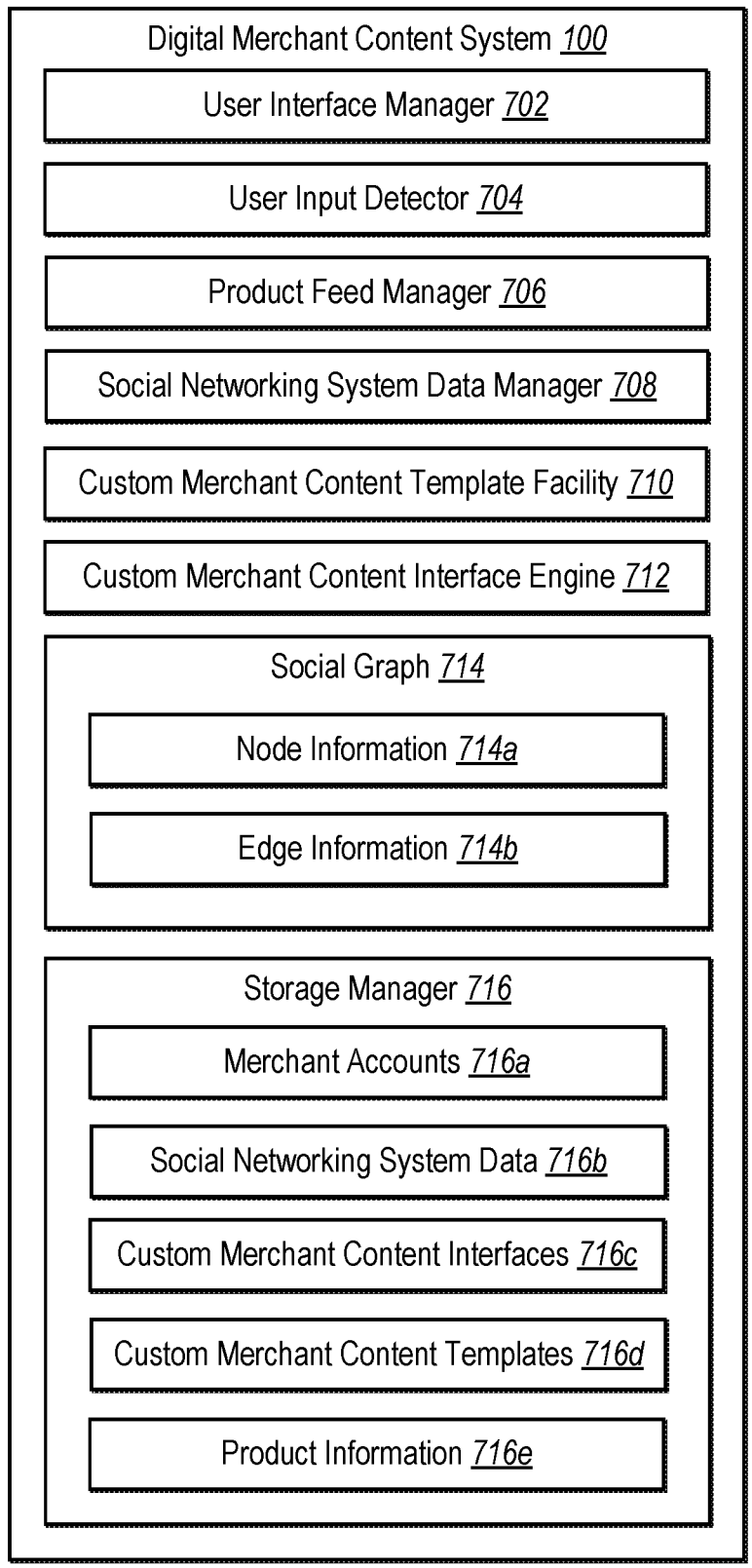
FIG. 7 illustrates a schematic diagram of a digital merchant content system in accordance with one or more embodiments.

Turning now to FIG. 7, additional detail will be provided regarding various components and capabilities of the digital merchant content system 100. In particular, FIG. 7 illustrates an example embodiment of the digital merchant content system 100 in accordance with one or more embodiments. As shown, the digital merchant content system 100 may include, but is not limited to a user interface manager 702; a user input detector 704; a product feed manager 706; a social networking system data manager 708; a custom merchant content template facility 710; a custom merchant content interface engine 712; a social graph 714 (including node information 714a and edge information 714b); and a storage manager 716 (including merchant accounts 716a, social networking system data 716b, custom merchant content interfaces 716c, custom merchant content templates 716d; and product information 716e).

As just mentioned, and as illustrated in FIG. 7, the digital merchant content system 100 includes the user interface manager 702. The user interface manager 702 can provide, manage, and/or control a graphical user interface (or simply "user interface") for use with the digital merchant content system 100 (e.g., the user interfaces 204, 302, and 404 and/or the custom merchant content interfaces 440, 520, and 600-606). In particular, the user interface manager 702 may facilitate presentation of information by way of an external component of a client device. For example, the user interface manager 702 may display a user interface by way of a display screen associated with the client device. The user interface may be composed of a plurality of graphical components, objects, and/or elements that allow a user to perform a function. The user interface manager 702 can present, via the client device, a variety of types of information, including text, images, video, audio, characters, or other information. Moreover, the user interface manager 702 can provide a variety of user interfaces specific to any variety of functions, programs, applications, plug-ins, devices, operating systems, and/or components of the client device (e.g., via a social networking application). Additional details with respect to various example user interface elements are described throughout with regard to various embodiments containing user interfaces.

In addition to the user interface manager 702, as shown in FIG. 7, the digital merchant content system 100 also includes the user input detector 704. The user input detector 704 can detect, identify, monitor, receive, process, capture, and/or record various types of user input. For example, the user input detector 704 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 704 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 704 can detect and identify various types of user interactions with user input devices, such as select events, drag events, scroll events, and so forth. For example, in the event the client device includes a touch screen, the user input detector 704 can detect one or more touch gestures (e.g., swipe gestures, tap gestures, pinch gestures, or reverse pinch gestures) from a user that forms a user interaction. The user input detector 704 can also detect a user interaction with respect to a variety of user interface elements, such as selection of a graphical button, a drag event within a graphical object, or a particular touch gesture directed to one or more graphical objects or graphical elements of a user interface.

In addition, as illustrated in FIG. 7, the digital merchant content system 100 also includes the product feed manager 706. The product feed manager 706 can identify, receive, obtain, collect, gather, manage, update, modify, delete, check, and/or maintain one or more product feeds. For example, as described, the product feed manager 706 can obtain a product feed comprising an updating database of product information. Similarly, as described above, the product feed manager 706 can obtain a product feed by parsing product information from an updating website that includes merchant products.

Furthermore, as illustrated in FIG. 7, the digital merchant content system 100 also includes the social networking system data manager 708. The social networking system data manager 708 can retrieve, obtain, identify, detect, gather, and analyze social networking system data. In particular, the social networking system data manager 708 can monitor user input (e.g., user input in relation a social networking system) and gather social networking system data based on the user interactions. For example, as described above, the social networking system can monitor user input to determine user characteristics, user history (e.g., purchase history), selections, or views.

Moreover, as shown in FIG. 7, the digital merchant content system 100 also includes the custom merchant content template facility 710. The custom merchant content template facility 710 can generate, create, modify, select, update, and/or provide one or more custom merchant content templates. In particular, the custom merchant content template facility 710 can generate one or more custom merchant content templates comprising one or more media content items and an unpopulated product display layout (e.g., media content items specified by a merchant and an unpopulated product display layout specified by a merchant). Moreover, as described above, the custom merchant content template facility 710 can select a subset of custom merchant content templates from a plurality of custom merchant content templates (e.g., based on product information 716e or social networking system data 716b).

Additionally, as illustrated in FIG. 7, the digital merchant content system 100 also includes the custom merchant content interface engine 712. The custom merchant content interface engine 712 can generate, create, modify, update, provide, link, select, and/or identify custom merchant content interfaces. In particular, the custom merchant content interface engine 712 can generate one or more custom merchant content interfaces based on one or more custom merchant content templates.

For example, the custom merchant content interface engine 712 can identify a custom merchant content template (e.g., a custom merchant content template generated via the custom merchant template facility 710) and an unpopulated product display layout in the custom merchant content template. Moreover, as described above, the custom merchant content interface engine 712 can generate a custom merchant content interface by populating the unpopulated product display layout based on a product feed (e.g., a product feed obtained via the product feed manager 706), social networking system data (e.g., social networking system data obtained via the social networking system data manager 708), and or merchant preferences (e.g., merchant preferences obtained by the custom merchant content template facility 710). More specifically, as described above, the custom merchant content interface engine 712 can utilize a ranking algorithm to select products. Furthermore, the custom merchant content interface can populate a product display layout based on the selected products.

In addition, as mentioned above, the custom merchant content interface engine 712 can generate a plurality of custom merchant content interfaces. Moreover, the custom merchant interface engine 712 can generate links between the custom merchant content interfaces. In particular, the custom merchant content interface engine 712 can dynamically link the custom merchant content interfaces by generating links and embedding the links in elements of the custom merchant content interfaces.

As further illustrated in FIG. 7, in the case of the digital merchant content system 100 comprising a social networking system, the digital merchant content system 100 may include a social graph 714 for representing and analyzing a plurality of users and concepts. As shown in FIG. 7, the social graph 714 can include node information 714a that stores information comprising nodes for users, nodes for concepts, and/or nodes for items. In addition, the social graph 714 can include edge information 714b comprising relationships between nodes and/or actions occurring within the social-networking system. Further detail regarding social-networking systems, social graphs, edges, and nodes is presented below.

As shown in FIG. 7, the digital merchant content system 100 may also contain the storage manager 716. The storage manager 716 maintains data for the digital merchant content system 100. The storage manager 716 can maintain data of any type, size, or kind, as necessary to perform the functions of the digital merchant content system 100.

As shown in FIG. 7, the storage manager 716 includes merchant accounts 716a (e.g., information regarding one or more merchants that utilize the digital merchant content system 100, such as merchant preferences or associations between a merchant and custom merchant content templates or product feeds); social networking system data 716b; merchant content interfaces 716c; merchant content templates 716d; and product information 716e.

Each of the components 702-716 of the digital merchant content system 100 and their corresponding elements may be in communication with one another using any suitable communication technologies. It will be recognized that although components 702-716 and their corresponding elements are shown to be separate in FIG. 7, any of components 702-716 and their corresponding elements may be combined into fewer components, such as into a single facility or module, divided into more components, or configured into different components as may serve a particular embodiment.

The components 702-716 and their corresponding elements can comprise software, hardware, or both. For example, the components 702-716 and their corresponding elements can comprise one or more instructions stored on a computer-readable storage medium and executable by processors of one or more computing devices. The components 702-716 and their corresponding elements can comprise hardware, such as a special purpose processing device to perform a certain function or group of functions. Additionally, or alternatively, the components 702-716 and their corresponding elements can comprise a combination of computer-executable instructions and hardware.

Furthermore, the components 702-716 of the digital merchant content system 100 may, for example, be implemented as one or more stand-alone applications, as one or more modules of an application, as one or more plug-ins, as one or more library functions or functions that may be called by other applications, and/or as a cloud-computing model. Thus, the components 702-716 of the digital merchant content system 100 may be implemented as a stand-alone application, such as a desktop or mobile application. Furthermore, the components 702-716 of the digital merchant content system 100 may be implemented as one or more web-based applications hosted on a remote server. Alternatively, or additionally, the components of the digital merchant content system 100 may be implemented in a suit of mobile device applications or "apps."

Figure 8:
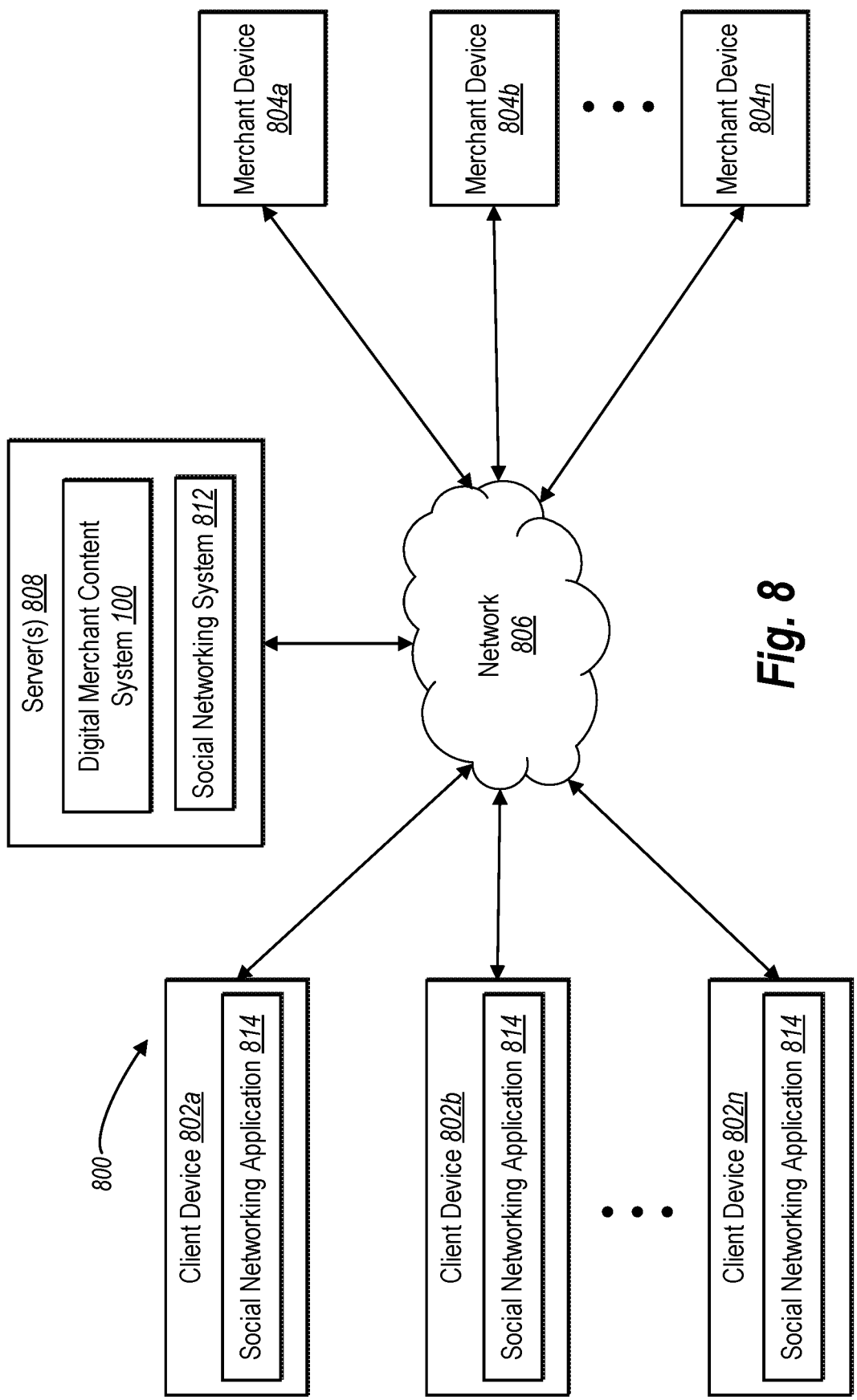
FIG. 8 illustrates a schematic diagram of a network environment in which the methods and systems disclosed herein may be implemented in accordance with one or more embodiments.

Turning now to FIG. 8, further information will be provided regarding implementation of the digital merchant content system 100. Specifically, FIG. 8 illustrates a schematic diagram of one embodiment of an exemplary system environment ("environment") 800 in which the digital merchant content system 100 can operate. As illustrated in FIG. 8, the environment 800 can include client devices 802a-802n (e.g., the client device 106), merchant devices 804a-804n (e.g., the merchant device 102), a network 806, and server(s) 808. The client devices 802a-802n, merchant devices 804a-804n, the network 806, and the server(s) 808 may be communicatively coupled with each other either directly or indirectly (e.g., through the network 806). The client devices 802a-802n, merchant devices 804a-804n, the network 806, and the server(s) 808 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 8, the environment 800 can include the client devices 802a-802n, and the merchant devices 804a-804n. The client devices 802a-802n, and merchant devices 804a-804n (e.g., the client device 106, merchant device 102, or the computing devices 200, 400, and 500) may comprise any type of computing device. For example, the client devices 802a-802n, and merchant devices 804a-804n may comprise one or more personal computers, laptop computers, mobile devices, mobile phones, tablets, special purpose computers, TVs, or other computing devices. In one or more embodiments, the client devices 802a-802n, and merchant devices 804a-804n may comprise computing devices capable of communicating with each other or the server(s) 808. The client devices 802a-802n, and merchant devices 804a-804n may comprise one or more computing devices as discussed in greater detail below.

As shown, the client devices 804a-804n may include a social networking application 814 (e.g., the social networking application 406). In particular, the social networking application 814 can comprise software for interacting with a social networking system 812 (e.g., the social networking system 104). For example, the social network application 814 can provide social networking feed comprising posts from other users of the social networking system 812. Similarly, the social networking application 814 can send and receive electronic communications (e.g., comments or electronic messages) between client devices via the social networking system 812.

As illustrated in FIG. 8, the client devices 802a-802n, merchant devices 804a-804n, and/or the server(s) 808 may communicate via the network 806. The network 806 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 806 may be any suitable network over which the client devices 802a-802n, and merchant devices 804a-804n (or other components) may access the server(s) 808 or vice versa. The network 806 will be discussed in more detail below in relation to FIG. 10.

Moreover, as illustrated in FIG. 8, the environment 800 also includes the server(s) 808. The server(s) 808 may generate, store, receive, and/or transmit any type of data, including merchant accounts 716a, social networking system data 716b, custom merchant content interfaces 716c, custom merchant content templates 716d, or product information 716e. For example, the server(s) 808 may receive data from the client device 802a and send the data to the client device 802b. Additionally, the server(s) 808 may receive data from the merchant device 804a and send the data to the client device 802a. As illustrated, in one example, server(s) 808 can host a social networking system 812. In one or more embodiments, the server(s) 808 may comprise a data server. The server(s) 808 can also comprise a communication server or a web-hosting server. Regardless, the server(s) 808 can be configured to receive a wide range of electronic documents or communications, including but not limited to, text messages, instant messages, social-networking messages, social-networking posts, emails, tags, comments, and any other form of electronic communications or electronic documents. Additional details regarding the server(s) 808 will be discussed below.

Although FIG. 8 illustrates three client devices 802a-802n and three merchant devices 804a-804n, it will be appreciated that the client devices 802a-802n and merchant devices 804a-804n can represent any number of computing devices (fewer or greater than shown). Similarly, although FIG. 8 illustrates a particular arrangement of the client devices 802a-802n, merchant devices 804a-804n, the network 806, and the server(s) 808, various additional arrangements are possible.

By way of example, in one or more embodiments the merchant device 804a sends a request to the server(s) 808 (e.g., the social networking system 812) to generate a custom merchant content template. The server(s) 808 can provide a custom merchant content generation tool to the merchant device 804a and the merchant device 804a can collect user input and send the user input to the server(s) 808 (e.g., via the user input detector 704). In response, the server(s) 808 can generate (e.g., via the custom merchant content template facility 710) one or more custom merchant content templates.

Further, the client device 802a can send a request to the server(s) 808 (e.g., via the social networking application 814) for a social networking feed. In response, the server(s) 808 can provide (e.g., via the user interface manager 702) a selectable element corresponding to the merchant. Upon receiving an indication that the user of the client device 802a selected the selectable element, the server(s) 808 can generate a custom merchant content interface (e.g., via the custom merchant content interface engine 712) based on the custom merchant content template. For example, the server(s) 808 can generate a custom merchant content interface by populating unpopulated elements of a custom merchant content interface based on a product feed (e.g., obtained via the product feed manager 706) and social networking system data (e.g., obtained via the social networking system data manager 708). Moreover, the server(s) 808 can provide the custom merchant content interface to the one or more client devices 802a-802n.

Moreover, the server(s) 808 can generate custom merchant content templates and custom merchant content interfaces in relation to a plurality of merchants. Indeed, although the previous example discussed generating custom merchant content templates based on user input from a merchant obtained via the merchant device 804a, the server(s) 808 can also generate custom merchant content templates and custom merchant content interfaces specific to merchants corresponding to the merchant devices 804b-804n.

As illustrated by the previous example embodiments, the digital merchant content system 100 may be implemented in whole, or in part, by the individual elements 802a-808 of the environment 800. Although FIG. 8 illustrates the digital merchant content system 100 implemented with regard to the server(s) 808, it will be appreciated that components of the digital merchant content system 100 can be implemented in any of the components of the environment 800. For example, in one or more embodiments, the custom merchant content template facility 710 can be implemented on the merchant device 802a.

Similarly, although FIG. 8 illustrates the social networking system 812 implemented via the server(s) 808 as a component separate from the digital merchant content system 100, it will be appreciated that the social networking system 812 can also be implemented on its own server(s). Moreover, in one or more embodiments, the social networking system 812 is implemented as a part of the digital merchant content system 100.

Figure 9:
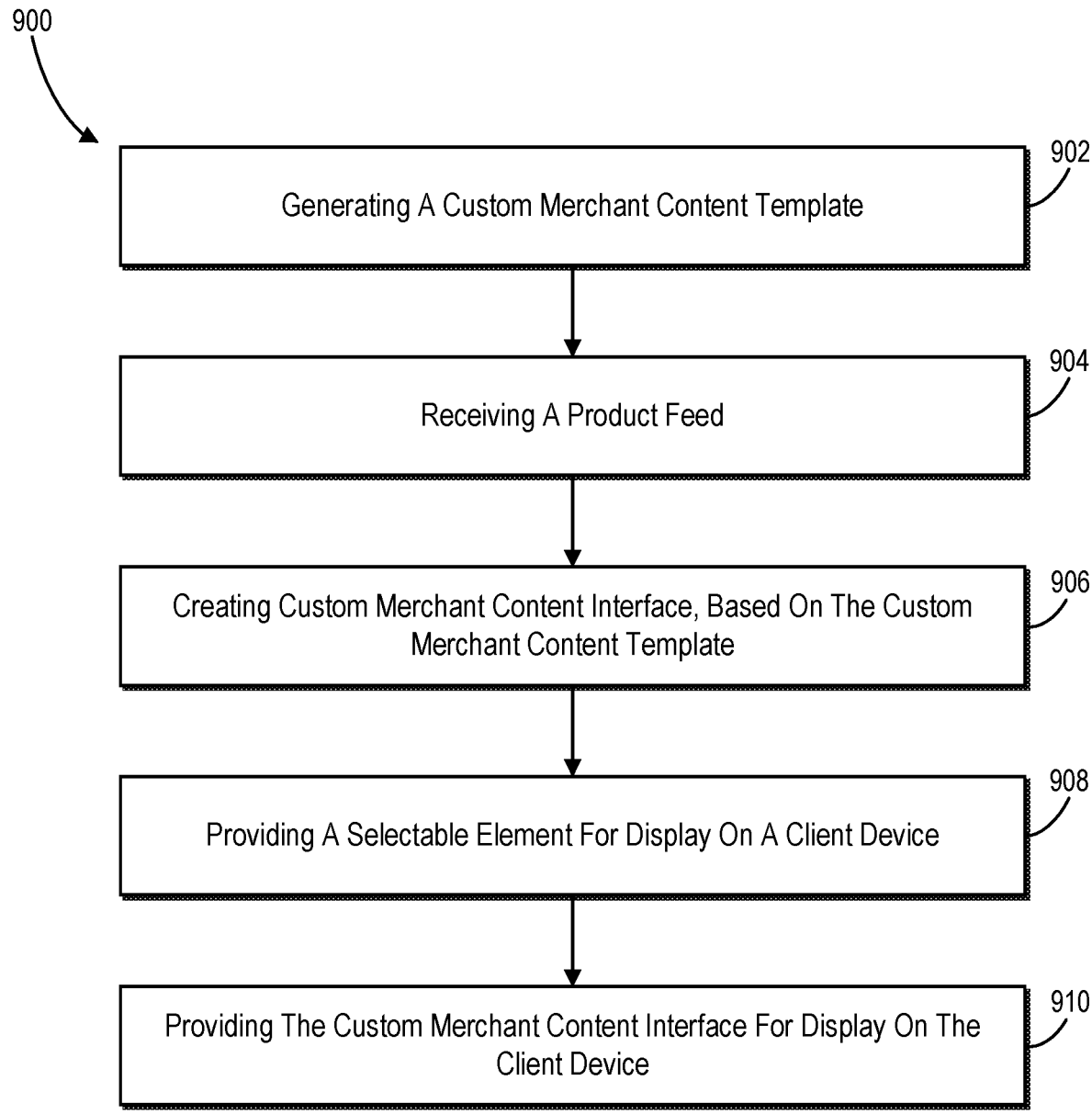
FIG. 9 illustrates a flow chart of a method of generating a custom merchant content interface in accordance with one or more embodiments.

FIGS. 1-8, the corresponding text, and the examples, provide a number of different systems and devices that generate a custom merchant content interface based on a custom merchant content template. In addition to the foregoing, embodiments can also be described in terms of flowcharts comprising acts and steps in a method for accomplishing a particular result. For example, FIG. 9 illustrates a flowchart of exemplary methods in accordance with one or more embodiments of the present invention. The methods described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of generating a custom merchant content interface in accordance with one or more embodiments. In one or more embodiments, the method 900 is performed in a digital medium environment that includes the digital merchant content system 100. The method 900 is intended to be illustrative of one or more methods in accordance with the present disclosure, and is not intended to limit potential embodiments. Alternative embodiments can include additional, fewer, or different steps than those articulated in FIG. 9.

As illustrated in FIG. 9, the method 900 includes an act 902 of generating a custom merchant content template. In particular, the act 902 can includes generating, by at least one processor of a social networking system, a custom merchant content template, the custom merchant content template comprising one or more media content items specified by a merchant and an unpopulated product display layout specified by the merchant. For instance, in one or more embodiments the act 902 comprises providing for display to a merchant, via a computing device, a plurality of interactive elements within a graphical user interface; receiving user input via the computing device indicating modifications to the interactive elements within the graphical user interface, the modifications comprising the one or more media content items specified by the merchant and the unpopulated product display layout specified by the merchant; and generating the custom merchant content template to reflect the modifications of the interactive elements. Moreover, the act 902 can include maintaining the custom merchant content template on the social networking system.

In addition, the act 902 can include generating a plurality of custom merchant content templates corresponding to the merchant. Further, the act 902 can include selecting the custom merchant content template from the plurality of custom merchant content templates based on at least one of: user characteristics, product sales via the social networking system, product clicks via the social networking system, time, or the product feed.

As shown in FIG. 9, the method 900 also includes an act 904 of receiving a product feed. In particular, the act 904 can include receiving, by the social networking system, a product feed comprising product information corresponding to the merchant. For instance, in one or more embodiments, the act 904 can include receiving, by the social networking system, a website corresponding to the merchant comprising one or more product advertisements; and analyzing the website and the one or more product advertisements to determine the product information. Furthermore, the act 904 can include receiving an update to the product feed comprising updated product information.

As illustrated in FIG. 9, the method 900 also includes an act 906 of creating a custom merchant content interface, based on the custom merchant content template. In particular, the act 9 can include creating, by at least one processor of the social networking system, a custom merchant content interface by populating the unpopulated product display layout within the custom merchant content template based on the product information from the product feed. In one or more embodiments, the act 906 can include wherein creating the custom merchant content interface comprises accessing the custom merchant content template on the social networking system.

Moreover, the act 906 can also include creating, by the at least one processor of the social networking system, a second custom merchant content interface by populating the unpopulated product display layout within the custom merchant content template based on the updated product information from updates to the product feed. In addition, the act 906 can include creating a second custom merchant content interface from a second custom merchant content template from the plurality of custom merchant content templates and the product feed by populating a second unpopulated product display layout of the second custom merchant content template. For example, the act 906 can include wherein creating the custom merchant content interface further comprises populating the unpopulated product display layout within the custom merchant content template with a media content item and a link to a second custom merchant content interface.

Furthermore, as shown in FIG. 9, the method 900 includes an act 908 of providing a selectable element for display on the client device. In particular, the act 908 can include providing a selectable element corresponding to the merchant for display on a client device of a user via a social networking application.

Additionally, as shown in FIG. 9, the method 900 includes an act 910 of providing the custom merchant content interface for display on the client device. In particular, the act 910 can include providing for display via the social networking application, the custom merchant content interface upon receiving an indication of a user interaction with a selectable element corresponding to the merchant.

Figure 10:
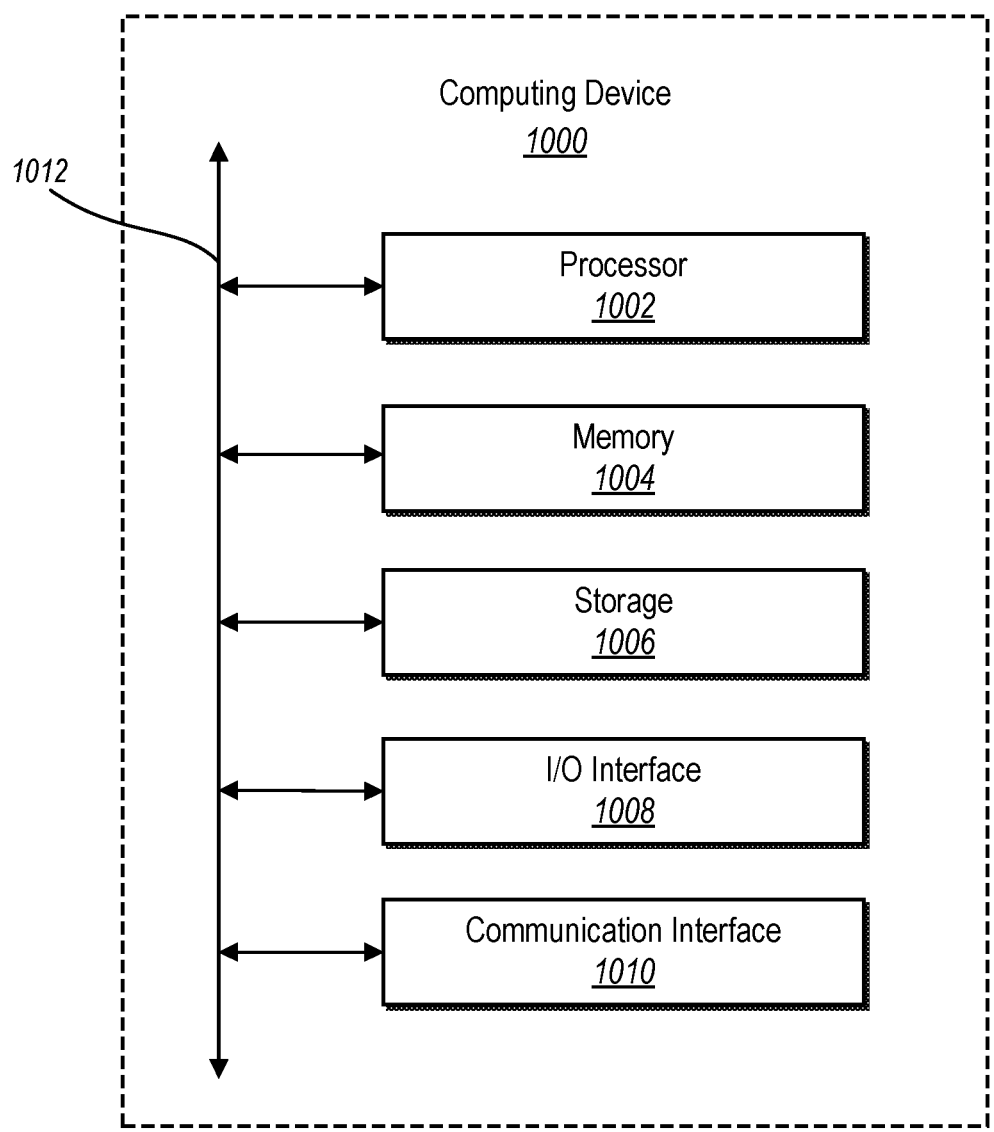
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the merchant device 102, the social networking system 104, the client device 106, the computing devices 200, 400, 500, the client devices 802a-802n, the merchant devices 804a-804n, and the sever(s) 808, comprise one or more computing devices in accordance with implementations of computing device 1000. As shown by FIG. 10, the computing device can comprise a processor 1002, a memory 1004, a storage device 1006, an I/O interface 1008, and a communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, environment 800 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similar to events, the calendar entries may include times, dates, locations and identities of other users.

Figure 11:
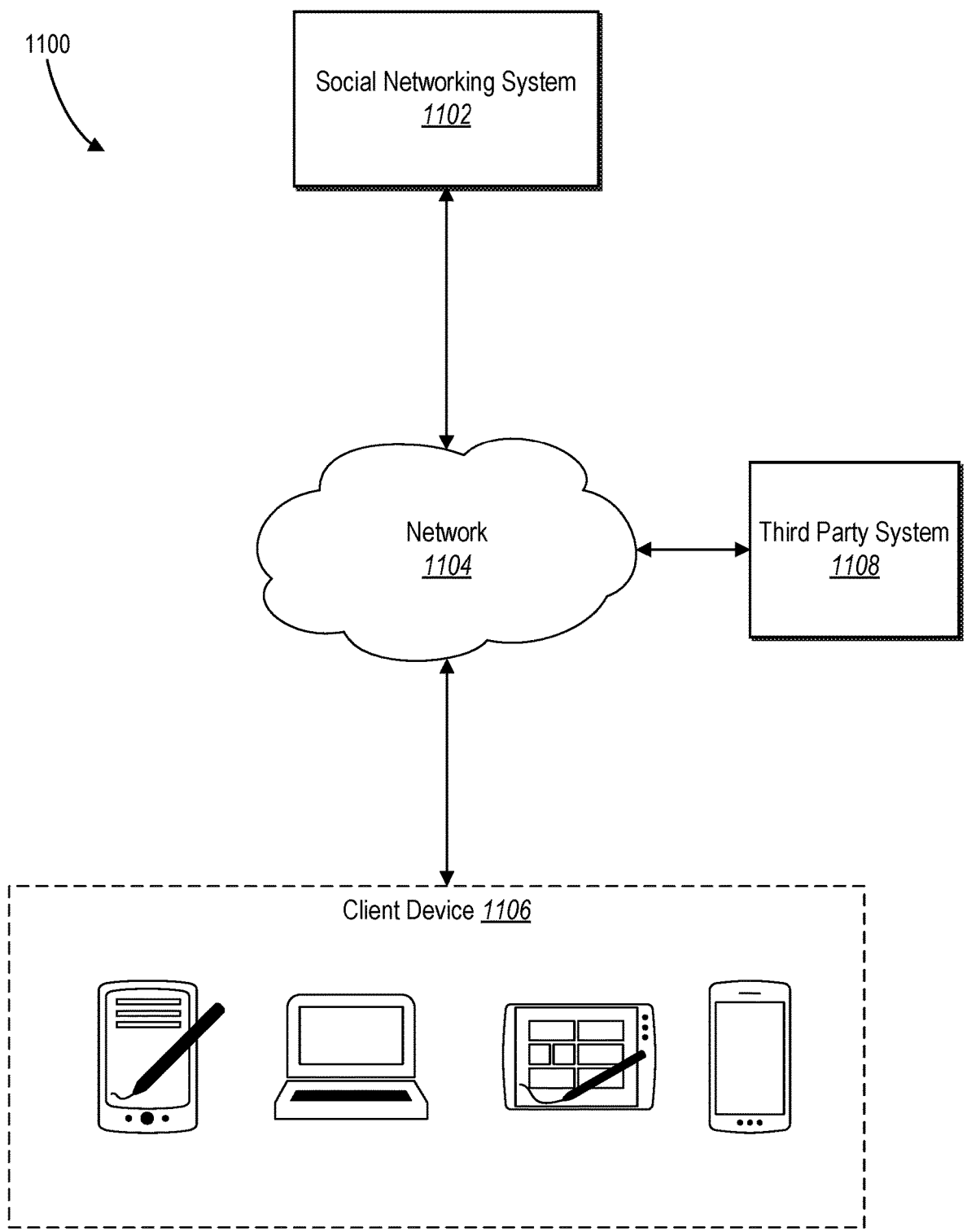
FIG. 11 illustrates a network environment of a social-networking system according one or more embodiments.

FIG. 11 illustrates an example network environment of a social-networking system. In particular embodiments, a social-networking system 1102 may comprise one or more data stores. In particular embodiments, the social-networking system 1102 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1102 may comprise one or more computing devices (e.g., servers) hosting functionality directed to operation of the social-networking system 1102. A user of the social-networking system 1102 may access the social-networking system 1102 using a client device such as client device 1106. In particular embodiments, the client device 1106 can interact with the social-networking system 1102 through a network 1104.

The client device 1106 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access the social-networking system 1102.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 12:
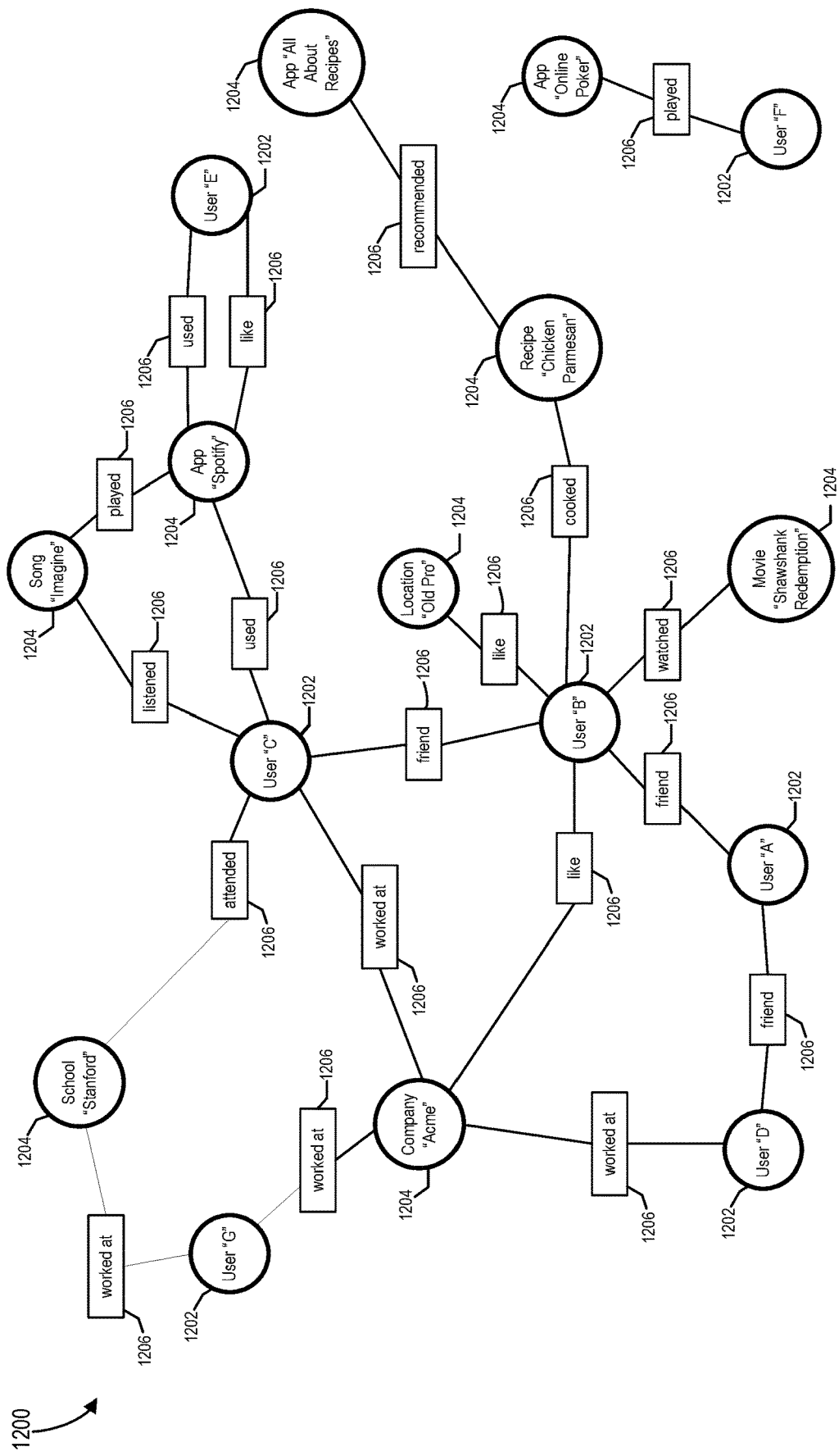
FIG. 12 illustrates an example social graph of a social networking system in accordance with one or more embodiments.

FIG. 12 illustrates example social graph 1200. In particular embodiments, social networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party server 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social networking system 1102 may send a "friend request" to the second user. If the second user confirms the "friend request," social networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to social networking system 1102 a message indicating the user's liking of the concept associated with the concept-profile page. In response to the message, social networking system 1102 may create an edge 1206 between user node 1202 associated with the user and concept node 1204, as illustrated by "like" edge 1206 between the user and concept node 1204. In particular embodiments, social networking system 1102 may store an edge 1206 in one or more data stores. In particular embodiments, an edge 1206 may be automatically formed by social networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition or as an alternative, an advertisement may include social-networking-system context directed to the user. As an example and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example and not by way of limitation, if a user may make frequently posts content related to "coffee" or variants thereof, social networking system 1102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1106 of the user). A first user may be more interested in other users or concepts that are closer to the first user. As an example and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser.

No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client system 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

providing, for display via a device, a merchant user interface for generating custom merchant content templates, the merchant user interface comprising a user interface element for generating unpopulated elements within unpopulated product display layouts of the custom merchant content templates;

based on user interaction with the merchant user interface, generating a custom merchant content template, the custom merchant content template comprising one or more media content items specified by input received via the device and an unpopulated product di splay layout;

receiving a product feed comprising product information corresponding to a merchant;

creating a custom merchant content interface by populating the unpopulated product display layout within the custom merchant content template based on the product information from the product feed;

providing a selectable element corresponding to the merchant for display on a client device of a user via a client application; and upon receiving an indication of a user interaction with the selectable element corresponding to the merchant, providing for display via the client application, the custom merchant content interface without redirecting the client device to an additional application or a web site from the merchant.

2. The method of claim 1, wherein the custom merchant content template comprises a digital video specified by a first input received via the device, a digital image specified by a second input received via the device, and the unpopulated product display layout.

3. The method of claim 1, wherein the unpopulated product display layout comprises a plurality of unpopulated elements specified by additional input received via the device.

4. The method of claim 3, further comprising determining a size and a position of an unpopulated element from the plurality of unpopulated elements based on the additional input received via the device.

5. The method of claim 1, wherein creating the custom merchant content interface by populating the unpopulated product display layout within the custom merchant content template based on the product information from the product feed comprises:
   utilizing a ranking algorithm to select a product from the product feed;
   determining a media content item corresponding to the selected product; and
   populating the unpopulated product display layout utilizing the media content item corresponding to the selected product.

6. The method of claim 5, wherein utilizing the ranking algorithm to select the product from the product feed comprises determining a ranking score based on at least one of: digital merchant preferences or historical digital interactions corresponding to the product.

7. The method of claim 6, further comprising:
   determining a product order based on the product feed; and
   utilizing the product order to populate the unpopulated product display layout.

8. The method of claim 1, further comprising:
   generating a plurality of custom merchant content templates based on interaction with the merchant user interface; and
   generating a plurality of custom merchant content interfaces with dynamic links between the plurality of custom merchant content interfaces based on the plurality of custom merchant content templates.

9. A system comprising:
   at least one processor; and
   at least one non-transitory computer readable storage medium storing instructions that, when executed by the at least one processor, cause the system to:
   provide, for display via a device, a merchant user interface for generating custom merchant content templates, the merchant user interface comprising a user interface element for generating unpopulated elements within unpopulated product display layouts of the custom merchant content templates;
   based on user interaction with the merchant user interface, generate a custom merchant content template, the custom merchant content template comprising one or more media content items specified by input received via the device and an unpopulated product di splay layout;
   receive a product feed comprising product information corresponding to a merchant;
   create a custom merchant content interface by populating the unpopulated product display layout within the custom merchant content template based on the product information from the product feed;
   provide a selectable element corresponding to the merchant for display on a client device of a user via a client application; and
   upon receiving an indication of a user interaction with the selectable element corresponding to the merchant, provide for display via the client application, the custom merchant content interface without redirecting the client device to an additional application or a web site from the merchant.

10. The system of claim 9, wherein the custom merchant content template comprises a digital video specified by a first input received via the device, a digital image specified by a second input received via the device, and the unpopulated product display layout.

11. The system of claim 9, wherein the unpopulated product display layout comprises a plurality of unpopulated elements specified by additional input received via the device.

12. The system of claim 11, further comprising instructions that, when executed by the at least one processor, cause the system to determine a size and a position of an unpopulated element from the plurality of unpopulated elements based on the additional input received via the device.

13. The system of claim 9, further comprising instructions that, when executed by the at least one processor, cause the system to create the custom merchant content interface by:
   utilizing a ranking algorithm to select a product from the product feed;
   determining a media content item corresponding to the selected product; and
   populating the unpopulated product display layout utilizing the media content item corresponding to the selected product.

14. The system of claim 13, further comprising instructions that, when executed by the at least one processor, cause the system to utilize the ranking algorithm to select the product from the product feed by determining a ranking score based on at least one of: digital merchant preferences or historical digital interactions corresponding to the product.

15. A non-transitory computer readable medium storing instructions thereon that, when executed by at least one processor, cause a computer system to:
   provide, for display via a device, a merchant user interface for generating custom merchant content templates, the merchant user interface comprising a user interface element for generating unpopulated elements within unpopulated product display layouts of the custom merchant content templates;
   based on user interaction with the merchant user interface, generate a custom merchant content template, the custom merchant content template comprising one or more media content items specified by input received via the device and an unpopulated product di splay layout;
   receive a product feed comprising product information corresponding to a merchant;
   create a custom merchant content interface by populating the unpopulated product display layout within the custom merchant content template based on the product information from the product feed;
   provide a selectable element corresponding to the merchant for display on a client device of a user via a client application; and
   upon receiving an indication of a user interaction with the selectable element corresponding to the merchant, provide for display via the client application, the custom merchant content interface without redirecting the client device to an additional application or a web site from the merchant.

16. The non-transitory computer readable medium of claim 15, wherein the custom merchant content template comprises a digital video specified by a first input received via the device, a digital image specified by a second input received via the device, and the unpopulated product display layout.

17. The non-transitory computer readable medium of claim 15, wherein the unpopulated product display layout comprises a plurality of unpopulated elements specified by additional input received via the device.

18. The non-transitory computer readable medium of claim 17, further comprising instructions that, when executed by the at least one processor, cause the computer system to determine a size and a position of an unpopulated element from the plurality of unpopulated elements based on the additional input received via the device.

19. The non-transitory computer readable medium of claim 15, further comprising instructions that, when executed by the at least one processor, cause the computer system to:
  determine a product order based on the product feed; and
  utilize the product order to populate the unpopulated product display layout.

20. The non-transitory computer readable medium of claim 15, further comprising instructions that, when executed by the at least one processor, cause the computer system to:
  generate a plurality of custom merchant content templates based on interaction with the merchant user interface; and
  generate a plurality of custom merchant content interfaces with dynamic links between the plurality of custom merchant content interfaces based on the plurality of custom merchant content templates.

\* \* \* \* \*